US011214263B2

(12) United States Patent
Sato et al.

(10) Patent No.: US 11,214,263 B2
(45) Date of Patent: Jan. 4, 2022

(54) MANAGEMENT ASSISTANCE SYSTEM

(71) Applicant: HITACHI TRANSPORT SYSTEM, LTD., Tokyo (JP)

(72) Inventors: Kiminori Sato, Tokyo (JP); Yuhi Shinohara, Tokyo (JP)

(73) Assignee: Hitachi Transport System, Ltd., Tokyo (JP)

( * ) Notice: Subject to any disclaimer, the term of this patent is extended or adjusted under 35 U.S.C. 154(b) by 0 days.

(21) Appl. No.: 17/050,203

(22) PCT Filed: Jan. 11, 2019

(86) PCT No.: PCT/JP2019/000677
§ 371 (c)(1),
(2) Date: Oct. 23, 2020

(87) PCT Pub. No.: WO2019/207848
PCT Pub. Date: Oct. 31, 2019

(65) Prior Publication Data
US 2021/0237744 A1 Aug. 5, 2021

(30) Foreign Application Priority Data
Apr. 25, 2018 (JP) .............................. JP2018-084053

(51) Int. Cl.
*B60W 40/08* (2012.01)
*B60W 50/14* (2020.01)
(Continued)

(52) U.S. Cl.
CPC ............ *B60W 40/08* (2013.01); *B60W 50/14* (2013.01); *G06Q 10/10* (2013.01); *G06Q 50/265* (2013.01);
(Continued)

(58) Field of Classification Search
CPC .. B60W 40/08; B60W 50/14; B60W 2420/42; G06Q 10/10; G06Q 50/265; G07C 5/008; G07C 5/02; G07C 2205/02
See application file for complete search history.

(56) References Cited

U.S. PATENT DOCUMENTS

| 2004/0054468 | A1  | 3/2004 | Yamada et al. |
| 2010/0030434 | A1  | 2/2010 | Okabe et al. |
| 2019/0147263 | A1* | 5/2019 | Kuehnle ............. G07C 5/0808 340/439 |

FOREIGN PATENT DOCUMENTS

| JP | 2003130662 A | 5/2003 |
| JP | 2006023937 A | 1/2006 |

(Continued)

OTHER PUBLICATIONS

International Preliminary Report on Patentability dated Nov. 5, 2020 for International Application No. PCT/JP2019/000677. 9 pages.

(Continued)

*Primary Examiner* — Michael D Lang
(74) *Attorney, Agent, or Firm* — Knobbe, Martens, Olson & Bear LLP

(57) ABSTRACT

A management assistance system can include: an imaging device; a first monitoring device; a second monitoring device; an instruction terminal; and a server. The instructing terminal can be configured to determine whether or not the caution determination condition is satisfied based on first monitoring information transmitted from the first monitoring device and second monitoring information transmitted from the second monitoring device, and transmit a dashcam video cut instruction signal to the imaging device when determining that the caution determination condition is satisfied. The imaging device can extract information of a predetermined time width including a reception time of the (Continued)

dashcam video cut instruction signal from the continuous dashcam video information to create dashcam footage information, associates the dashcam footage information with date and time information and identification information, and transmits the dashcam footage information to the server.

13 Claims, 16 Drawing Sheets

(51) Int. Cl.
*G06Q 10/10* (2012.01)
*G06Q 50/26* (2012.01)
*G07C 5/00* (2006.01)
*G07C 5/02* (2006.01)

(52) U.S. Cl.
CPC .............. *G07C 5/008* (2013.01); *G07C 5/02* (2013.01); *B60W 2420/42* (2013.01); *G07C 2205/02* (2013.01)

(56) References Cited

FOREIGN PATENT DOCUMENTS

| | | |
|---|---|---|
| JP | 2007203913 A | 8/2007 |
| JP | 2007293536 | 11/2007 |
| JP | 2008123448 A | 5/2008 |
| JP | 2008234414 A | 10/2008 |
| JP | 2008296682 A | 12/2008 |
| JP | 20103110 | 1/2010 |
| JP | 2014027961 A | 2/2014 |
| JP | 2014123287 A | 7/2014 |
| JP | 201514988 | 1/2015 |
| JP | 2016081079 A | 5/2016 |
| JP | 6132327 61 | 5/2017 |

OTHER PUBLICATIONS

International Search Report issued in Application No. PCT/JP2019/000677, dated Apr. 2, 2019.
Non-Final Office action received in Japanese Patent Application No. 2020003463, dated in 9 pages.

\* cited by examiner

Fig. 3

| Determination Value | Point | Determination Content | Content |
|---|---|---|---|
| 1-1 | 2 | Left Lane Departure Warning | Detect When Crossing to Left Side of Lane Without Turning On Turn Indicator While Traveling at Higher Than or Equal to Predetermined Speed Per Hour |
| 1-2 | 2 | Right Lane Departure Warning | Detect When Crossing to Right Side of Lane Without Turning on Turn Indicator While Traveling at Higher Than or Equal to Predetermined Speed Per Hour |
| 1-3 | 7 | Distance With Front Vehicle Warning | Notify When Number of Seconds to Reach Point Where Front Vehicle Was at Becomes Constant When Continued to Travel at Same Vehicle Speed |
| 1-4 | 8 | Low-Speed Front Vehicle Collision Warning | Detect When Falling within Virtual Bumper Range Set in Advance at Time of Low-Speed Traveling |
| 1-5 | 8 | Front Vehicle Collision Warning | Monitor Front Vehicle and Detect When Determining that there Is Risk of Colliding within A Predetermined Second from Relative Speed, Relative Acceleration, Etc. |
| 1-6 | 10 | Pedestrian Collision Warning | Detect When Collision to Pedestrian in Front is Predicted During Traveling |
| 2-1 | 2 | Acceleration: Small Risk | Detect When Occurrence of G in One of Up, Down, Left, Right, Front, and Back is Relatively Small |
| 2-2 | 5 | Acceleration: Medium Risk | Detect When Occurrence of G in One of Up, Down, Left, Right, Front, and Back is Large to Certain Extent |
| 2-3 | 8 | Acceleration: Large Risk | Detect When Occurrence of G in One of Up, Down, Left, Right, Front, and Back is Extremely Large |

Fig. 5

| Determination Value | Point | Determination Content | Content |
|---|---|---|---|
| 3-0 | 0 | Seating Not Confirmed | Detect When Data Cannot be Measured |
| 3-1 | 0 | Sympathetic Nerve Enhanced State | Detect When Driver 2 is in Excited State |
| 3-2 | 5 | Normal Determination | Detect When Driver 2 is not or Barely Tired |
| 3-3 | 7 | Attention Determination | Detect When Driver 2 is likely to Get Sleepy |
| 3-4 | 7 | Attention Determination | Detect When Driver 2 Feels Fatigue |
| 3-5 | 8 | Warning Determination | Detect When Driver 2 is Sleepy |
| 3-6 | 8 | Warning Determination | Detect Indication of Driver 2 to Fall Asleep |
| 3-7 | 10 | Emergency Warning Determination | Awakening Reducing State of Driver 2 Cannot be Detected |
| 3-8 | 10 | Emergency Warning Determination | Detect When Driver 2 is in Urgent Sleep State or Sleep State. |

| Identification Information di | Date and Time Information Dt | Dashcam Footage Information dms |
|---|---|---|
| 0001 | 20180201131020 8 | |
| 0001 | 20180201171218 8 | |

|  | LF/ HF < 0.8 | 0.8 < LF/ HF < 2.0 | 2.0 < LF/ HF < 5.0 | 5.0 < LF/ HF |
|---|---|---|---|---|
| 57 < Ti | Good | Good | Attention | Caution |
| 42 < Ti < 57 | Good | Good | Attention | Caution |
| 37 < Ti < 42 | Attention | Attention | Attention | Caution |

Ti : Deviation Value
LF: Index Reflecting Sympathetic Nerve
HF: Index Reflecting Parasympathetic Nerve

MANAGEMENT ASSISTANCE SYSTEM

TECHNICAL FIELD

The present invention relates to a management assistance system that assists management of a driving situation of a driver who drives a target vehicle.

BACKGROUND ART

Conventionally, there is a device that when a biological signal of a driver is acquired in real time and when the biological signal is examined and analyzed and determination is made that the physical state is not suitable for driving, a break is encouraged or an alarm is generated to wake the driver. As such a device, one that senses electroencephalogram and makes the determination (see Patent Document 1 below), one that makes the determination from information related to heart rate, blood pressure, and autonomic nerves (see Patent Document 2 below), and the like are known.

PRIOR ART DOCUMENT

Patent Document

Patent Document 1: Japanese Patent Publication No. 6132327
Patent Document 2: JP-A-2014-27961

SUMMARY OF THE INVENTION

Problems to be Solved by the Invention

The fatigue and drowsiness of driver greatly affect the driving situation. Generally, a driver is encouraged to stop the vehicle and take a break when feeling tired or drowsy in order to drive safely.

On the other hand, since the driver is also a human being, the driver may become overconfident on his/her physical condition and continue to drive due to geographical environmental factors such as the destination point, which is the destination of transportation, and the break point scheduled in advance approaching, and psychological environmental factors such as the driver desiring to deliver the package to the destination point as soon as possible. In such a case, if each of the devices described above is mounted on the vehicle, the physical condition of the driver can be objectively known by the notification of the warning sound, and the warning sound can act as an incentive to take a break.

The carrier owns a plurality of vehicles and employs a large number of drivers. From the viewpoint of safety management, the carrier often desires to manage the driving situation of each driver. However, each of the devices described above is developed only for the purpose of making the driver conscious by issuing a warning sound in each vehicle. That is, even if these devices are mounted on each vehicle, the driving situation of each driver in a distant place cannot be managed.

In many cases, the carrier obligates daily reports when the operation service is completed according to office regulations and the like. As described above, since the driver recognizes that the warning sound has been notified during driving, for example, by describing that such notification has been made in the daily report, the operation manager can indirectly grasp the daily driving state of the driver. However, in reality, since the driver is also a human being, the situation in which the warning sound is notified cannot be remembered in detail, and in a case where the number of notifications of the warning sound is large, it is difficult to report all the warning sounds.

Many recent business vehicles have a dashcam (dashboard camera). With this device, the situation at the time of driving is recorded by a dashcam video. Thus, it is theoretically possible for an operation manager to confirm the driving state of the driver by regularly checking such dashcam video. However, in a carrier that employs a large number of drivers, the number of drivers to be managed by the operation manager inevitably becomes large, and the time of the dashcam video imaged by the dashcam corresponds to the driving time of each driver, and thus it is practically impossible for the operation manager to check all the dashcam videos.

Generally, a dashcam is installed for the purpose of imaging and recording a dashcam video in order to verify the cause later when an accident or trouble actually occurs. A large-scale carrier has an extremely large number of vehicles, several hundred to several thousand, and storing all the dashcam videos imaged by the dashcams installed in all of these vehicles in the server is not realistic considering the balance between the frequency of using the stored dashcam videos and the number (size) of storage media required for storage. Actually, the dashcam video information is generally deleted every predetermined number of days such as several days or one week. Due to the circumstances described above, the dashcam video information is deleted without mostly being seen unless an accident or trouble occurs.

As an experimental rule in occupational hazards, it is known that many near-miss events (medical incidents) are behind serious accidents. The inventors of the present invention thought that it would be possible to encourage the drive to improve their driving consciousness if there exists a system that, when an event corresponding to such near-miss occurs, allows the driver or the operation manager to easily check the dashcam video corresponding to such event. However, at current time point, such a system does not exist.

In view of the above problems, it is an object of the present invention to provide a management assistance system with which, when a driving state of a driver is at a level of concern, a dashcam video in which a driving situation in such state is recorded can be confirmed with a simple method.

Means for Solving the Problems

The present invention relates to a management assistance system that assists management of a driving state of a driver driving a target vehicle, the management assistance system including:
an imaging device that is mounted on the target vehicle to image at least a front of the target vehicle as continuous dashcam video information;
a first monitoring device that is mounted on the target vehicle to monitor a travel state of the target vehicle;
a second monitoring device that is mounted on the target vehicle to monitor a physical state during driving of the driver;
an instructing terminal that is mounted on the target vehicle and configured to receive information from the first monitoring device and the second monitoring device; and
a server configured to wirelessly communicate with at least one of the instructing terminal and the imaging device; wherein the first monitoring device transmits first monitoring information corresponding to the travel state to the instructing terminal when the travel state satisfies a predetermined first monitoring condition;

the second monitoring device transmits second monitoring information corresponding to the physical state during driving to the instructing terminal when the physical state during driving satisfies a predetermined second monitoring condition;

the instructing terminal is configured to, store a caution determination condition for determining whether or not the driving state of the driver reaches a level of concern, and determine whether or not the caution determination condition is satisfied based on the first monitoring information transmitted from the first monitoring device and the second monitoring information transmitted from the second monitoring device, and transmit a dashcam video cut instruction signal to the imaging device when determining that the caution determination condition is satisfied;

the imaging device, when receiving the dashcam video cut instruction signal transmitted from the instructing terminal, extracts information of a predetermined time width including a reception time of the dashcam video cut instruction signal from the continuous dashcam video information to create dashcam footage information, associates the dashcam footage information with date and time information related to the imaged time, and identification information for identifying the target vehicle or the driver serving as a transmitting source, and transmits the information to the server through the instructing terminal or directly; and the server stores the dashcam footage information.

In the present specification, the "manager" does not necessarily have to be a legal "operation manager", but refers to a person who has an operation authority for the "manager terminal".

The instructing terminal included in the management assistance system according to the present invention determines whether or not the driving state of the driver reaches a level of concern based on the information transmitted from the first monitoring device and the second monitoring device mounted on the target vehicle. The first monitoring device is a device that monitors the travel state of the target vehicle. The second monitoring device is a device that monitors the physical state during driving of the driver.

When the travel state of the target vehicle satisfies a predetermined first monitoring condition, the first monitoring device transmits information (first monitoring information) corresponding to the travel state to the instructing terminal. For example, when sudden brake is applied on the target vehicle or when the separation distance between the target vehicle and a front obstacle (vehicle, pedestrian, etc.) becomes short, the first monitoring device detects these situations and transmits the first monitoring information corresponding to the detected situation to the instructing terminal.

When the physical state during driving of the driver satisfies a predetermined second monitoring condition, the second monitoring device transmits information (second monitoring information) corresponding to the physical state to the instructing terminal. For example, when a possibility of the driver feeling tired is detected based on biological information, and the like, the second monitoring device transmits the second monitoring information corresponding to the detected situation to the instructing terminal.

The instructing terminal is configured to be able to receive the above information from the first monitoring device and the second monitoring device, and is preferably configured to be able to communicate with the server. For example, it may be a general-purpose product such as a smartphone or a tablet PC, or may be a dedicated device.

It is assumed that the first monitoring device and the second monitoring device are set with strict monitoring conditions (first monitoring condition, second monitoring condition) for the purpose of ensuring driving safety alone.

For example, with the first monitoring device, when another vehicle suddenly cuts in from the adjacent lane, detection may be made that the inter-vehicle distance has reduced and determination may be made that the first monitoring condition is satisfied. That is, although there is no particular problem with the driving state of the driver, there are cases where the travel state satisfies the first monitoring condition by the influence of the travel state of another vehicle.

The second monitoring device is a device that monitors the physical state during driving, and as one example, monitors the physical state during driving based on the biological signal of the driver. However, the correlation between the value indicated by the biological signal of the driver and the actual physical condition of the driver varies from driver to driver. Therefore, whether the driver is feeling fatigue or sleepy is difficult to genuinely determine based only on the monitoring result of the second monitoring device.

The operation terminal included in the management assistance system according to the present invention stores in advance a monitoring-required determination condition for determining whether or not the driving state reaches the level of concern based on the first monitoring information transmitted from the first monitoring device and the second monitoring information transmitted from the second monitoring device. When the travel state of the target vehicle and the physical state during driving of the driver satisfy a certain condition, it can be considered that the driving state reaches the level of concern, and is a driving state corresponding to a so-called near-miss event.

The instructing terminal transmits a predetermined signal (dashcam video cut instruction signal) to the imaging device only when the driving state of the driver is determined to reach a level of concern based on the first monitoring information and the second monitoring information.

As described above, the imaging device is mounted in the target vehicle and images at least the front of the target vehicle as continuous dashcam video information. This dashcam video information is preferably temporarily recorded in a storage medium provided in the imaging device. The imaging device may also image and record the vicinity of the target vehicle such as the side and the rear, the facial expression of the driver and the like other than the front of the target vehicle.

When receiving the dashcam video cut instruction signal transmitted from the instructing terminal, the imaging device extracts information of a predetermined time width including the reception time of the dashcam video cut instruction signal from the continuous dashcam video information to create dashcam footage information. The imaging device provided in the present system may include a calculation processing means that extracts a part of the dashcam video data from the continuous dashcam video data.

The imaging device associates the dashcam footage information created in such manner with date and time information related to the imaged time, and identification information for identifying the target vehicle or the driver, and transmits the information to the server through the instructing terminal or directly. The server stores the dashcam footage information.

With such a configuration, only the event determined to be the driving state corresponding to the near-miss event in the present system is automatically stored in the server as a dashcam footage. Thus, for example, the driver can easily check the corresponding dashcam video even on a relatively close day from the day when the target driving was performed such as after the end of the daily work or the next day under the management of the manager (operation manager), and improve his/her driving consciousness.

By the way, a method of uploading the continuous dashcam video information recorded in the imaging device such as a dashcam all from the imaging device side to the server in real time to be stored on the server side, and creating a dashcam footage including a time when a corresponding event occurred from the continuous dashcam video information stored in the server based on an operation instruction from the manager and the like is also theoretically possible.

However, as described above, as a large-scale carrier manages a huge number of vehicles, such as hundreds to thousands, performing the process of once storing the continuous dashcam video information imaged in each vehicle in the server under such circumstances imposes load on the server and requires the cost for preparing a necessary storage medium for storing a large amount of information and the enormous communication cost, and thus an extremely large investment is required, which is not realistic. Furthermore, when the vehicle is traveling in a long-distance tunnel in the order of km or an underground road, there may occur a case where the communication state between the imaging device and the server is cut off.

On the other hand, according to the system of the present invention, the dashcam footage information merely needs to be transmitted to the server only when the driving state of the driver is determined to be the level of concern by the instructing terminal, and furthermore, the required communication volume and the storage capacity required on the server side are extremely small as the dashcam footage information to be transmitted is dashcam footage information obtained by cutting only a predetermined time width from the continuous dashcam video information in advance. Therefore, the investment cost when the carrier introduces this system is extremely suppressed.

As described above, since the dashcam footage information stored in the server is a dashcam footage (e.g., about 5 to 10 seconds) that includes an event corresponding to a driving state corresponding to a near-miss event in advance, the driver and the manager can easily look back after the daily work.

The management assistance system may further include, a manager terminal configured to wirelessly communicate with the server; wherein
the instructing terminal may be configured to,
store a monitoring-required determination condition for determining whether or not the driving state of the driver reaches a monitoring-required level, which is more serious than the level of concern, together with the caution determination condition, and
when determining that the driving state of the driver satisfies the monitoring-required determination condition, transmit monitoring-required notification information indicating that the driving state of the driver reaches a monitoring-required level to the server together with the dashcam footage information; and the server may immediately transmit the dashcam footage information itself or address information in which the dashcam footage information is stored and the monitoring-required notification information to the manager terminal.

According to another aspect, the management assistance system may further include a manager terminal configured to wirelessly communicate with the instructing terminal; wherein
the instructing terminal may be configured to,
store a monitoring-required determination condition for determining whether or not the driving state of the driver is a monitoring-required level, which is more serious than the level of concern, together with the caution determination condition, and
when determining that the driving state of the driver satisfies the monitoring-required determination condition, transmit monitoring-required notification information indicating that the driving state of the driver is a monitoring-required level to the manager terminal together with the dashcam footage information.

According to such configurations, only when the driving state of the driver reaches the monitoring-required level beyond the level of concern, the notification indicating the same and the dashcam footage information itself corresponding to the corresponding event or the address in which the relevant dashcam video is stored are notified to the manager terminal. When the manager detects the notification to the manager terminal, the manager can immediately check the corresponding dashcam video to grasp the driving state of the driver in a more or less near real time situation. The manager then can confirm the current physical condition or the like to the driver by, for example, using means such as a portable phone or wireless communication, as necessary.

This allows the manager to confirm and contact the driver after checking the dashcam video of the corresponding situation when the driving state of the driver is truly in a state that requires monitoring, and thus appropriate instructions can be given according to the individual situation of the driver.

The management assistance system may further include a manager terminal configured to wirelessly communicate with the server; wherein
when storing the dashcam footage information, the server may transmit information including the stored address to the manager terminal within a predetermined time period.

More specifically,
the first monitoring information may include information related to a point value converted to a numerical value according to a risk of the travel state;
the second monitoring information may include information related to a point value converted to a numerical value according to a non-awakening degree of the driver;
the caution determination condition may include information related to an attention target occurrence time interval and a cumulative point threshold value defined according to the risk and the non-awakening degree; and
based on the received first monitoring information and the second monitoring information as well as the reception time thereof, when cumulative values of the point values of the first monitoring information and the second monitoring information within the attention target occurrence time interval exceed the cumulative point threshold value, the instructing terminal may determine that the caution determination condition is satisfied.

For example, when the driver feels sleepy or fatigue, the frequency of occurrence of a specific travel state such as sudden braking, sudden acceleration, and sudden steering tends to increase. In addition, when the driver feels sleepy or fatigue, the frequency at which the second monitoring device determines that the physical state during driving of the driver is a state of high non-awakening degree based on the biological signal of the driver increases. That is, according to the management assistance system described above, when a state indicating a high risk of a certain degree and/or a high non-awakening degree of a certain degree is detected at a certain frequency or more within a limited time, the instructing terminal determines that the driving state of the driver reaches a level of concern and transmits the dashcam video cut instruction signal to the imaging device, and the dashcam footage information is created on the imaging device side.

More specifically, the first monitoring device can detect at least one of a separation distance between the target vehicle and a front obstacle (vehicle, pedestrian, etc.) located in front of the target vehicle, whether the target vehicle departed from a lane in which the target vehicle is traveling, and an acceleration of the target vehicle, determines the risk set in advance based on the detection result; and the second monitoring device can detect at least one of a heartbeat and a pulse wave of the driver, and determine the non-awakening degree set in advanced based on the detection result.

The instructing terminal may store the caution determination condition corresponding to the identification information.

As described above, there may be individual differences in the correlation between the information obtained from the second monitoring device that monitors the physical state during driving of the driver and the genuine physical condition (drowsiness, fatigue) of the actual driver. Furthermore, there may be individual differences in the correlation between the information obtained from the first monitoring device that monitors the travel state of the target vehicle and the risk of the actual travel state, depending on the number of driving years, driving technique, and the like of the driver. According to the configuration described above, the caution determination condition that takes into consideration the individual characteristics of each driver can be set, so that the accuracy of determining whether or not the driving state of the driver reaches the level of concern can be further improved.

The instructing terminal may store the caution determination condition corresponding to the identification information. Furthermore, in this case, the instructing terminal may be configured to be able to correct the caution determination condition based on an environmental factor in which the past first monitoring information or the second monitoring information of the driver has been acquired, and/or the physical state before driving the target vehicle (pre-driving physical state). Furthermore, the monitoring-required determination condition may be configured to be corrected through a similar method.

For example, when the body temperature of the driver is slightly higher than the normal temperature in a state before driving, it is assumed that the driver is more likely to be fatigued than in normal times. Furthermore, for example, when the state of autonomic nerve of the driver is not preferable in a state before driving, it is assumed that the driver may more easily feel sleepy than in normal times and may tend to drive aimlessly. In such a case, for example, the instructing terminal corrects the caution determination condition and the monitoring-required determination condition of the driver so as to be stricter than usual. In particular, due to the stricter monitoring-required determination condition, even in a case where the monitoring-required notification information (and dashcam footage information) is not normally notified to the manager terminal, notification is made to the manager terminal so that the manager can monitor the driver more intensively.

Moreover, the instructing terminal may store the information of the time width according to the identification information, and transmit the information of the time width together with the dashcam video cut instruction signal to the imaging device when determining that the caution determination condition is satisfied; and the imaging device may extract the information of the time width transmitted from the instructing terminal including the reception time of the dashcam video cut instruction signal from the continuous dashcam video information to create the dashcam footage information.

Effect of the Invention

According to the management assistance system of the present invention, when the driving state of the driver reaches the level of concern, the dashcam video in which the driving situation under the relevant state is recorded can be confirmed through a simple method.

BRIEF DESCRIPTION OF THE DRAWINGS

FIG. 3 is a table showing a correspondence relationship between an example of a first monitoring condition and information converted into numerical values according to the risk of the travel state related to each condition.

FIG. 5 is a table showing a correspondence relationship between an example of a physical state during driving specified by a determination unit based on various biological signals of a driver and a determination value corresponding to each state.

MODE FOR CARRYING OUT THE INVENTION

First Embodiment

A first embodiment of a management assistance system according to the present invention will be described with reference to the drawings. This management assistance system is used for the purpose of assisting the management of the driving situation of the driver who drives the target vehicle.

Figure 1:
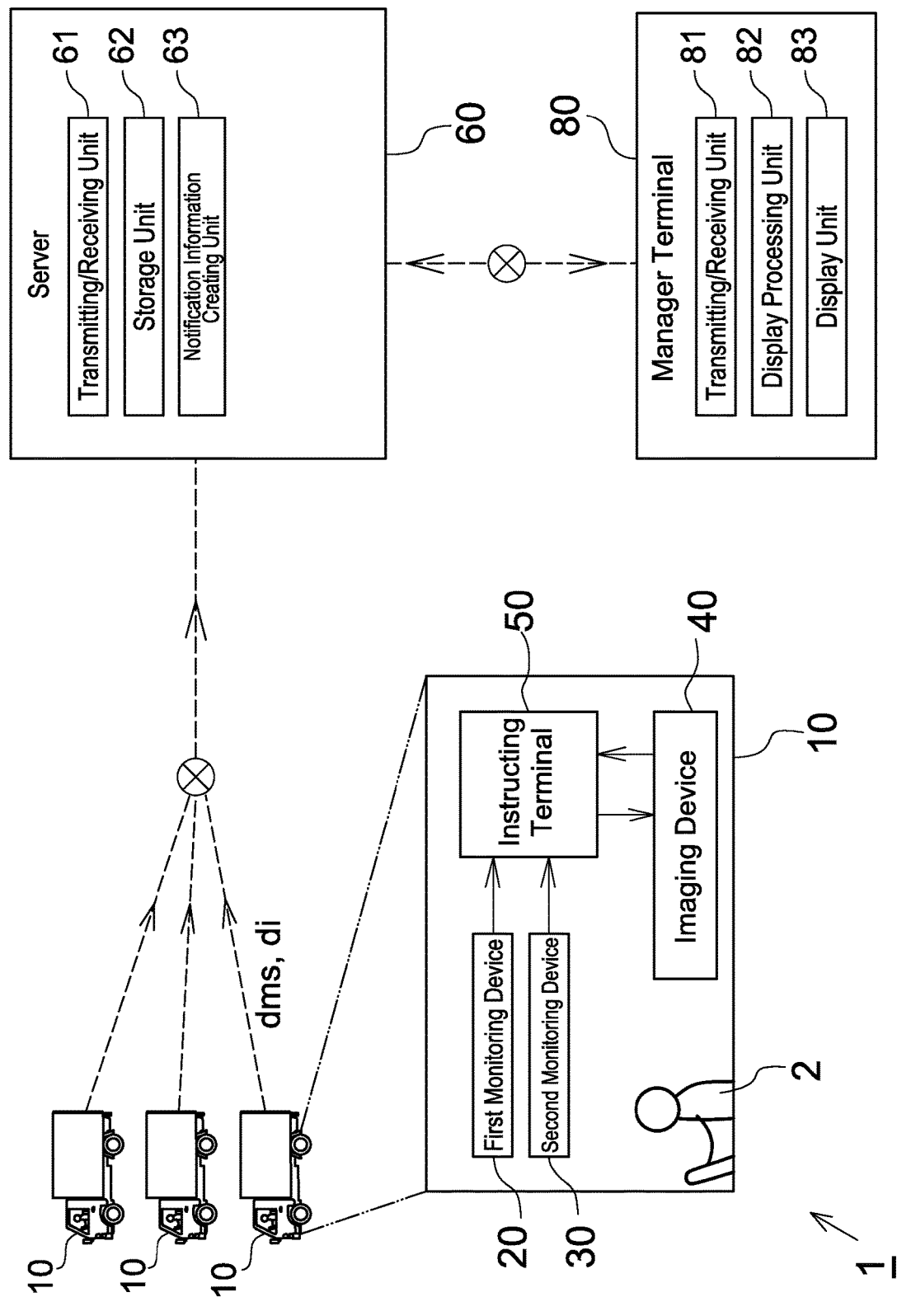
FIG. 1 is a block diagram schematically showing an overall configuration of a first embodiment of a management assistance system.

FIG. 1 is a block diagram schematically showing the overall configuration of the management assistance system. In the present embodiment, a management assistance system 1 includes a target vehicle 10, a server 60, and a manager terminal 80.

<Target Vehicle 10>

The target vehicle 10 is a vehicle to be driven by a driver 2. In the present embodiment, a case where the target vehicle 10 is a truck for transporting cargo will be described as an example, but the target vehicle may be other vehicles such as buses and taxis as long as the target vehicle is a vehicle used in an application in which the driver 2 drives and travels between a plurality of points.

The target vehicle 10 includes a first monitoring device 20, a second monitoring device 30, an imaging device 40, and an instructing terminal 50 which are mounted inside the vehicle.

The first monitoring device 20 and the second monitoring device 30 are both configured to communicate with the instructing terminal 50 in a wireless or wired manner. The format of this communication is not limited, and for example, Bluetooth (registered trademark), Wi-Fi (registered trademark), infrared communication, other dedicated communication, the Internet, or the like can be used. Furthermore, the instructing terminal 50 is configured to communicate with the imaging device 40 in a wireless or wired manner. The details of each device will be described below.

(First Monitoring Device 20)

Figure 2:
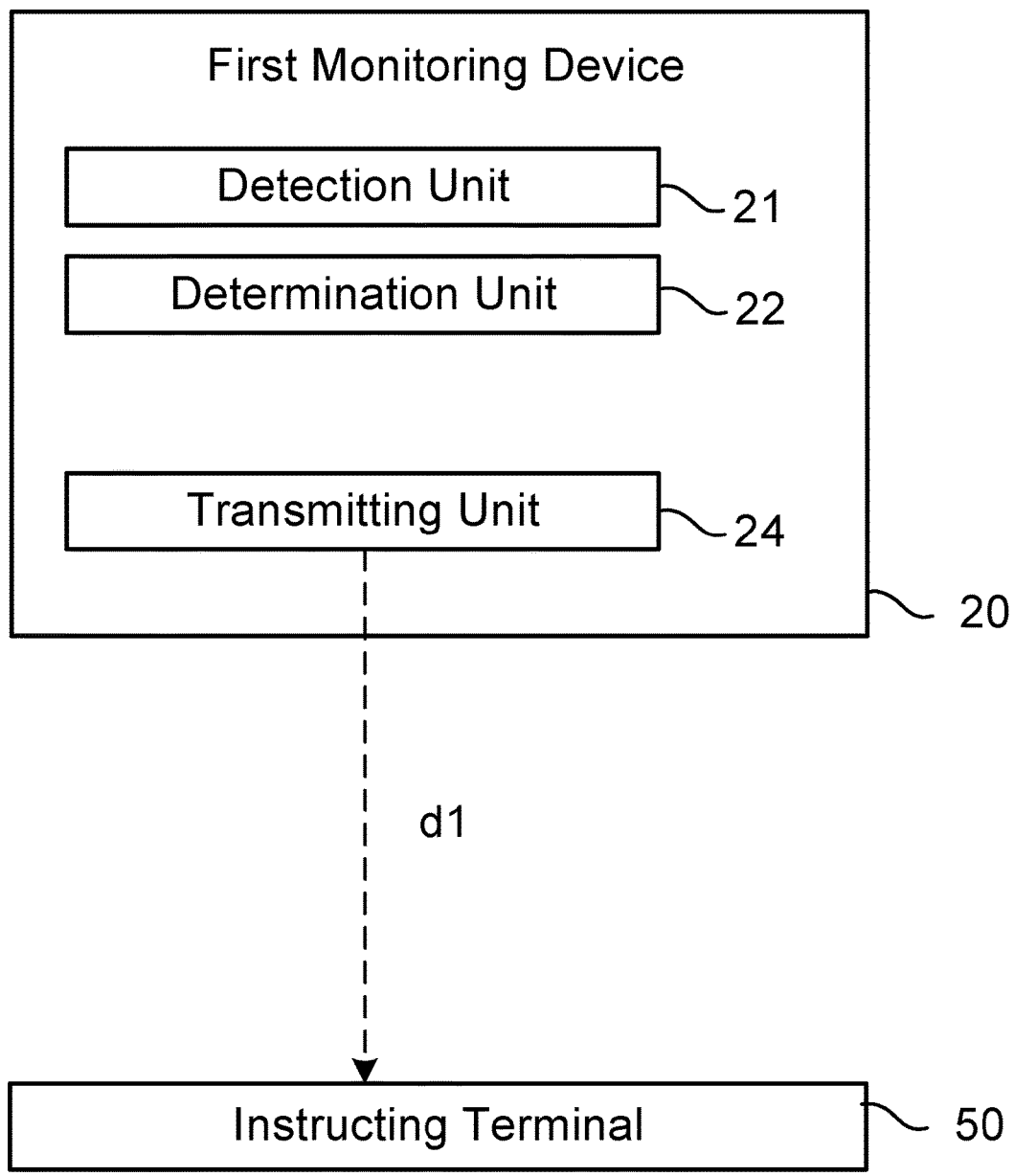
FIG. 2 is a block diagram schematically showing an internal configuration of a first monitoring device.

The first monitoring device 20 is a device that monitors the travel state of the target vehicle 10. More specifically, as shown in FIG. 2, the first monitoring device 20 includes a detection unit 21 that detects the travel state of the target vehicle 10, a determination unit 22 that determines whether or not the travel state of the target vehicle 10 satisfies a prescribed monitoring condition based on the result detected by the detection unit 21, and a transmitting unit 24 that transmits prescribed information to the instructing terminal 50.

The detection unit 21 includes an acceleration sensor that detects the acceleration of the target vehicle 10 and an imaging sensor that detects a separation distance from a front obstacle (vehicle, pedestrian, etc.) and/or a lane departure condition. Furthermore, the first monitoring device 20 may include a speed sensor that detects the speed of the target vehicle 10. Furthermore, the detection unit 21 may be configured to include another imaging sensor capable of imaging so as to include signals and road signs around the target vehicle and detecting whether or not the driving state of the target vehicle is violating these signals or the like. Some of these sensors may be configured by sensors mounted on the target vehicle 10 itself.

The determination unit 22 is a calculation processing unit that determines whether or not the travel state of the target vehicle 10 satisfies a predetermined monitoring condition (hereinafter referred to as "first monitoring condition") based on various information of the target vehicle 10 detected by the detection unit 21, and is configured by dedicated software and/or hardware. The first monitoring condition is stored in advance in a storage unit (not shown) in the first monitoring device 20.

FIG. 3 is a table showing an example of the first monitoring condition. Note that in FIGS. 3 and 5 to be described later, the determination value of the monitoring condition is expressed as "m-n" (m and n are both numbers), where the former "m" indicates the type of device (sensor) from which the data is acquired and the latter "n" indicates the content of the condition by being replaced with a numerical value. That is, the type of corresponding condition is identified by the expression "m-n". The device from which the data is acquired corresponds to the first monitoring device 20 or the second monitoring device 30, and/or an acceleration sensor or an imaging sensor (which sensor when there are a plurality of sensors) in the first monitoring device 20, and the like. The notation method of the determination value is an example, and the present invention is not limited to thereto.

Furthermore, "point" shown in FIGS. 3 and 5 to be described later is a numerical representation of the risk of the travel state of the driver 2 corresponding to the corresponding monitoring condition. This point is cumulatively added within a predetermined period described later. The numerical values of the points shown in these figures are merely examples.

(1) When the detection unit 21 detects that the target vehicle 10 has crossed the lane without turning on the turn indicator while the target vehicle 10 is traveling at higher than or equal to a prescribed speed (e.g., higher than or equal to 55 km/hour), the determination unit 22 sets a determination value 1-1 (left lane) or a determination value 1-2 (right lane) with respect to the travel state. Furthermore, the determination unit 22 sets the risk point to 2 points in each of the situations described above.

(2) When determining that the number of seconds to reach the point where the vehicle in front was at is less than or equal to a prescribed value (e.g., less than or equal to three seconds) at the time the target vehicle 10 continues to travel at the same vehicle speed based on the information detected by the detection unit 21, the determination unit 22 sets a determination value 1-3 with respect to the travel state. Furthermore, the determination unit 22 sets the risk point to 7 points in the situation described above.

(3) When determining that a vehicle body of the target vehicle 10 falls within a virtual bumper range set in advance while the target vehicle 10 is traveling at a low speed (e.g., less than or equal to 30 km/hour) based on the information detected by the detection unit 21, the determination unit 22 sets a determination value 1-4 with respect to the travel state. Furthermore, the determination unit 22 sets a risk point to 8 points in the situation described above.

(4) When determining that there is a risk of colliding with the vehicle in front within a prescribed second (e.g. 2.5 seconds) at the time the target vehicle 10 continues to travel at the same vehicle speed based on the information detected by the detection unit 21, the determination unit 22 sets a determination value 1-5 with respect to the travel state. Furthermore, the determination unit 22 sets a risk point to 8 points in the situation described above.

(5) When determining that there is a risk of the target vehicle 10 colliding with a pedestrian in front during traveling based on the information detected by the detection unit 21, the determination unit 22 sets a determination value 1-6 with respect to the travel state. Furthermore, the determination unit 22 sets the risk point to 10 points in the situation described above.

(6) Based on the change in acceleration detected by the detection unit 21, the determination unit 22 sets a determination value 2-1 (small risk), 2-2 (medium risk), and 2-3 (large risk) with respect to the travel state according to the magnitude of G generated in the target vehicle 10. The determination value 2-3 is the driving of highest risk. Furthermore, the determination unit 22 sets the risk point to 2 points, 5 points, and 8 points in each of the above situations.

In this determination, the determination unit 22 may detect the timing at which the engine started and exclude the change in acceleration at the relevant timing from the first monitoring condition.

When the determination unit 22 determines that the travel state of the target vehicle 10 satisfies the condition (first monitoring condition) as shown in the above example, the first monitoring device 20 transmits information (first monitoring information d1) indicating the travel state of the target vehicle 10 at the relevant time point from the transmitting unit 24 to the instructing terminal 50. The first monitoring information d1 includes each determination value and point value shown in FIG. 3.

(Second Monitoring Device 30)

Figure 4:
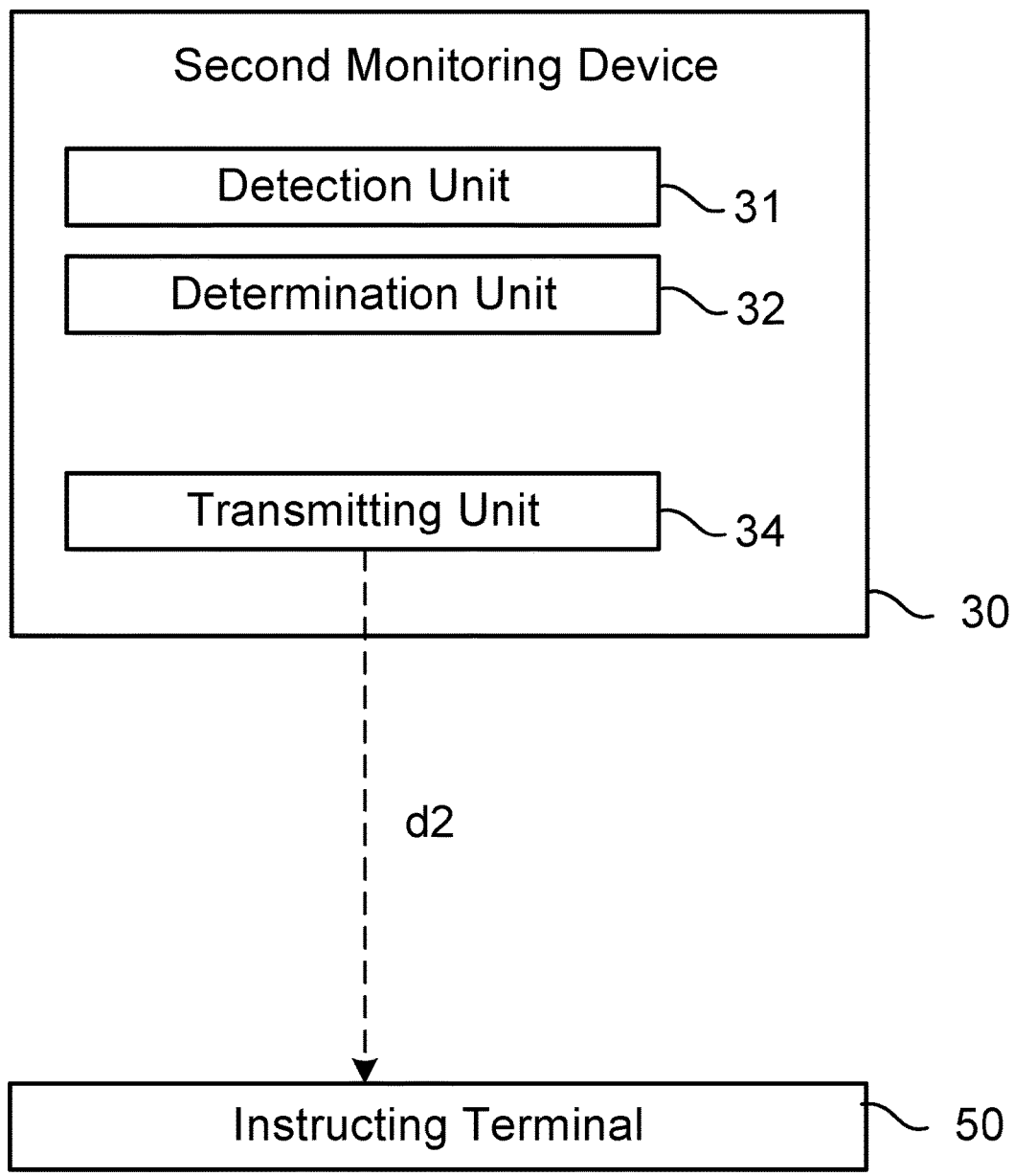
FIG. 4 is a block diagram schematically showing an internal configuration of a second monitoring device.

The second monitoring device 30 is a device that monitors the physical state during driving of the driver 2. More specifically, as shown in FIG. 4, the second monitoring device 30 includes a detection unit 31 that detects the physical state during driving of the driver 2, a determination unit 32 that determines whether or not the physical state during driving of the driver 2 satisfies a prescribed warning condition based on the result detected by the detection unit 31, and a transmitting unit 34 that transmits predetermined information to the instructing terminal 50.

The detection unit 31 is formed by, for example, a sensor provided on a seat on which the driver 2 sits, and detects biological signals such as the heartbeat and pulse wave of the driver 2. A pressure sensor can be used as an example. Furthermore, a state sensor that acquires a face image of a driver, and acquires biological information based on a state such as dozing or drowsiness and image analysis can be used.

The determination unit 32 is a calculation processing unit that specifies a physical state during driving of the driver 2 and determines whether or not the specified physical state during driving satisfies a predetermined monitoring condition (hereinafter referred to as "second monitoring condition") based on various biological signals of the driver 2 detected by the detection unit 31, and is configured by dedicated software and/or hardware. The second monitoring condition is stored in advance in a storage unit (not shown) in the second monitoring device 30.

FIG. 5 shows a correspondence relationship between an example of a physical state during driving specified by the determination unit 32 based on various biological signals of the driver 2 and determination values corresponding to each state.

(1) When determining that the seating of the driver 2 cannot be confirmed based on the information of the biological signal detected by the detection unit 31, the determination unit 32 sets a determination value 3-0 with respect to the physical state during driving of the driver 2. The determination unit 32 sets the risk point to 0 point in this situation. This setting is not necessary.

(2) Based on the information of the biological signal detected by the detection unit 31, the determination unit 32 sets a determination value 3-1 with respect to the physical state during driving of the driver 2 when determining that the sympathetic nerve of the driver 2 is enhanced and the driver is in an excited state, and sets a determination value 3-2 with respect to the physical state during driving of the driver 2 when determining that driver 2 is not or barely tired. Furthermore, the determination unit 32 sets the risk point to 0 point and 5 points, respectively, in each of the above situations. These situations correspond to a state in which the non-awakening degree of the driver 2 is relatively low (awakening degree relatively high).

However, the situation determined as the determination value 3-2 also corresponds to a case where the driver 2 is driving aimlessly, and thus the risk point is set to 5 points in the example of the present embodiment.

(3) Based on the information of the biological signal detected by the detection unit 31, the determination unit 32 sets a determination value 3-3 with respect to the physical state during driving of the driver 2 when determining as a state in which driver 2 is likely to get sleepy, and sets a determination value 3-4 with respect to the physical state during driving of the driver 2 when determining as a state in which driver 2 feels fatigue. Furthermore, the determination unit 32 sets the risk point to 7 points in each of the above situations. The determination values 3-3 and 3-4 correspond to a state in which the non-awakening degree of the driver 2 is not so low (awakening degree is not so high).

(4) Based on the information of the biological signal detected by the detection unit 31, the determination unit 32 sets a determination value 3-5 with respect to the physical state during driving of the driver 2 when determining as a state in which the driver 2 is sleepy, and sets a determination value 3-6 with respect to the physical state during driving of the driver 2 when determining as a state in which indication to fall asleep of the driver 2 is detected. Furthermore, the determination unit 32 sets the risk point to 8 points in each of the above situations. The determination values 3-5 and 3-6 correspond to the state in which the non-awakening degree of the driver 2 is high (awakening degree is low).

(5) Based on the information of the biological signal detected by the detection unit 31, the determination unit 32 sets a determination value 3-7 with respect to the physical state during driving of the driver 2 when determining that the driver 2 cannot detect the awakening degree reducing state (awakening degree reducing state), and sets a determination value 3-8 with respect to the physical state during driving of the driver 2 when determining that the driver 2 is in an urgent sleep state or reliably in a sleep state. Furthermore, the determination unit 32 sets the risk point to 10 points in each of the above situations. The determination values 3-7 and 3-8 correspond to the state in which the non-awakening degree of the driver 2 is extremely high (awakening degree is extremely low).

When the determination unit 32 determines that the physical state during driving of the driver 2 satisfies the condition (second monitoring condition) as shown in the above example, the second monitoring device 30 transmits information (second monitoring information d2) indicating the physical state during driving of the driver 2 at the relevant time point from the transmitting unit 34 to the instructing terminal 50. The second monitoring information d2 includes each determination value and point value shown in FIG. 5.

(Imaging Device 40)

Figure 6:
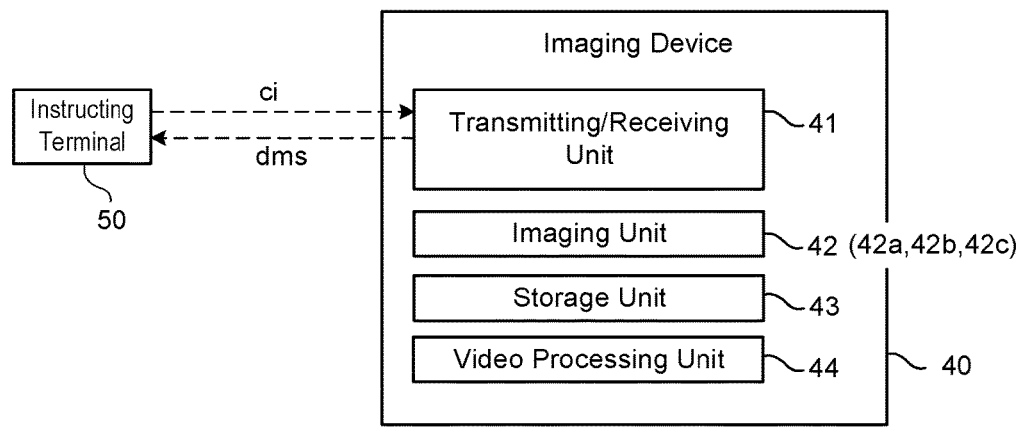
FIG. 6 is a block diagram schematically showing an internal configuration of an imaging device.

The imaging device 40 is mounted on the target vehicle 10 and images at least the front of the target vehicle 10 as continuous dashcam video information. More specifically, as shown in FIG. 6, the imaging device 40 includes, in addition to an imaging unit 42 that images a video, a transmitting/receiving unit 41 that transmits and receives information to and from the instructing terminal 50, a storage unit 43 that stores the continuous dashcam video information imaged by the imaging unit 42, and a video processing unit 44 that performs a process, to be described later, on the continuous dashcam video information stored in the storage unit 43.

Figure 7:
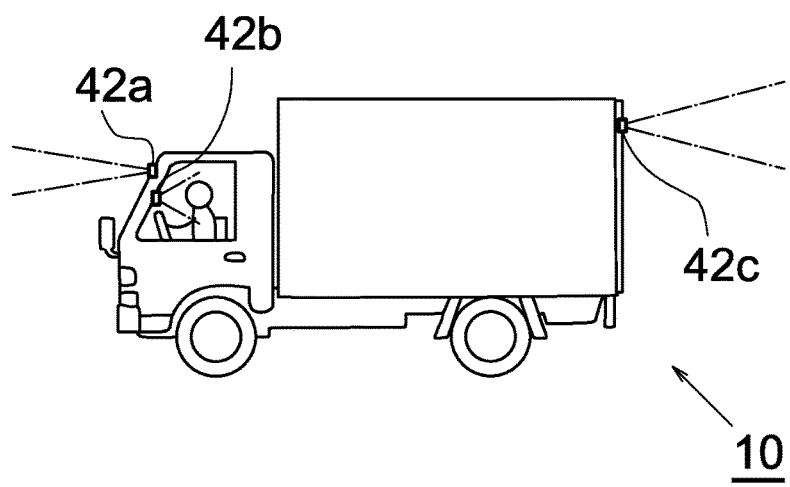
FIG. 7 is a view schematically showing the position of an imaging unit mounted in the target vehicle.

In the present embodiment, as shown in FIG. 7, the imaging unit 42 includes an imaging portion 42a that images the front of the target vehicle 10, an imaging portion 42b that images the driver 2 (inside the vehicle 10), and an imaging portion 42c that images the rear of the target vehicle 10. Hereinafter, the imaging portion 42a, the imaging portion 42b, and the imaging portion 42c are collectively referred to as the "imaging unit 42".

The imaging unit 42 is an imaging means including a known imaging sensor such as a CMOS or CCD. The imaging unit 42 is always imaging an image while the engine of the target vehicle 10 is operating or while the vehicle key is attached to the target vehicle 10. The continuous dashcam video information imaged by the imaging unit 42 is sequentially transmitted to the storage unit 43 and stored in the storage unit 43 together with the imaging time.

The storage unit 43 is formed of a storage medium such as a flash memory or a hard disk. Preferably, the storage unit 43 is configured to be removable. The storage unit 43 has a storage capacity capable of storing the continuous dashcam video information for one or more days (e.g., three days).

The video processing unit 44 is a calculation processing means that performs a process of generating dashcam video information of a predetermined time width including a designated time from the continuous dashcam video information stored in the storage unit 43, and is configured by dedicated software and/or hardware. That is, this process is a process of extracting/generating dashcam footage information from the continuous dashcam video information, and hereinafter, the dashcam video information generated by this process is referred to as "dashcam footage information".

Figure 8:
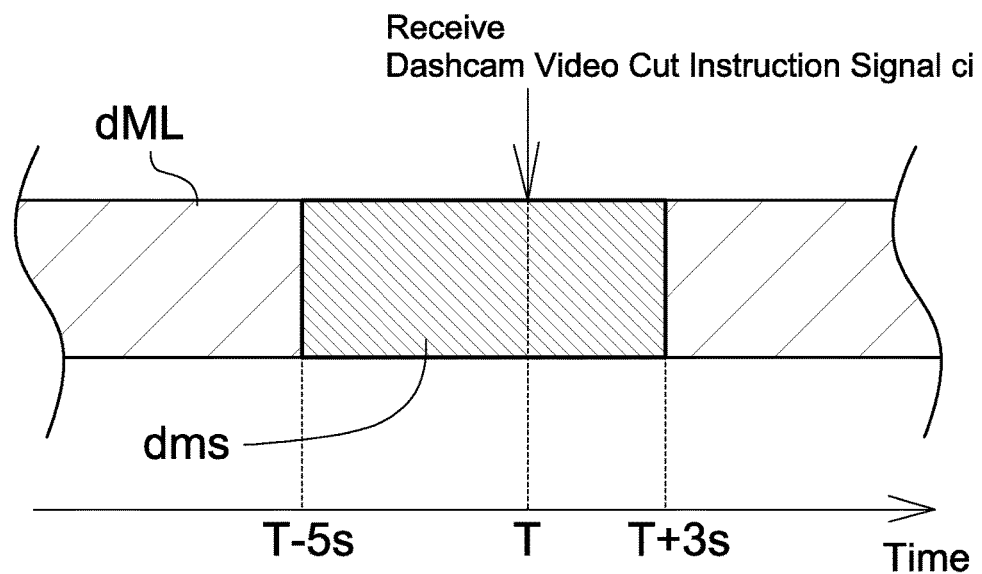
FIG. 8 is a view schematically showing the content of a process of a video processing unit for creating the dashcam footage information from the continuous dashcam video information.

More specifically, as shown in FIG. 8, when the transmitting/receiving unit 41 of the imaging device 40 receives a dashcam video cut instruction signal ci transmitted from the instructing terminal 50, the video processing unit 44 extracts information of a predetermined time width (three to five seconds before and after the reception time) including time T at which the dashcam video cut instruction signal ci is received, that is, information for eight seconds from time "T−5 seconds" to time "T+3 seconds" from the continuous dashcam video information dML stored in the storage unit 43, and generates the dashcam footage information dms. Then, the transmitting/receiving unit 41 transmits the dashcam footage information dms to the instructing terminal 50.

Note that, as shown in FIG. 7, when the imaging device 40 includes a plurality of imaging portions 42 (42a, 42b, 42c), the video processing unit 44 performs a synthesizing process so that all the dashcam videos are simultaneously displayed in one screen based on the respective continuous dashcam video information dML (dMLa, dMLb, dMLc) imaged by each imaging portion 42. Thereafter, the dashcam footage information dms (dmsa, dmsb, dmsc) is generated from the synthesizing processed continuous dashcam video information. At this time, the size and the image frame of the dashcam video imaged by each imaging portion 42 may be made uniform, or a large screen and a small screen may be combined. Of course, each continuous dashcam video information dML (dMLa, dMLb, dMLc) may be cut out individually to generate the dashcam footage information dms (dmsa, dmsb, dmsc) without forming the same dashcam video.

In the imaging device 40, the imaging unit 42 and the other processing units (transmitting/receiving unit 41, storage unit 43, and video processing unit 44) may be installed in separated places. That is, the transmitting/receiving unit 41, the storage unit 43, and the video processing unit 44 are stored in a predetermined housing, and each imaging portion 42 (42a, 42b, 42c) and the housing are wire-connected by a signal line, so that the continuous dashcam video information dML imaged by the imaging unit 42 can be transmitted to the storage unit 43 through the signal line.

(Instructing Terminal 50)

Figure 9:
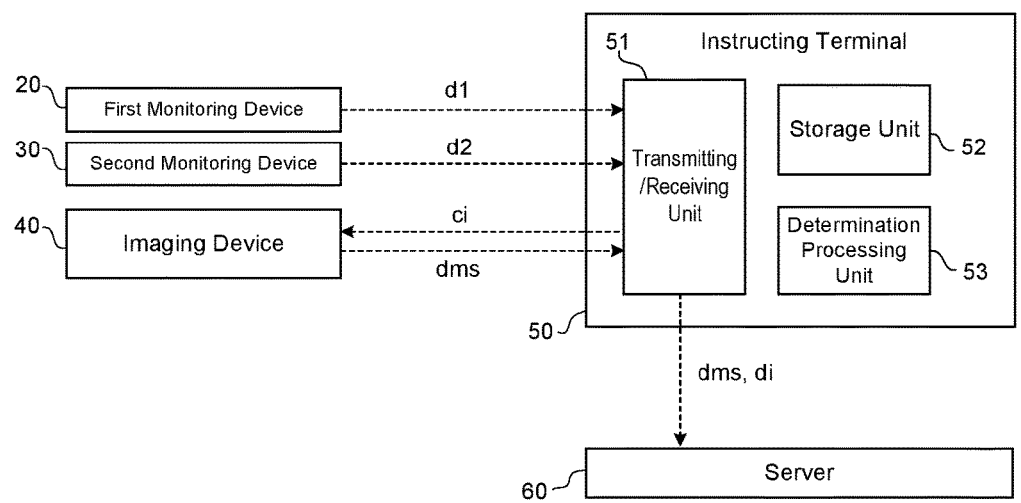
FIG. 9 is a block diagram schematically showing an internal configuration of an instructing terminal.

The instructing terminal 50 is configured to communicate with the first monitoring device 20, the second monitoring device 30, the imaging device 40, and the server 60. More specifically, as shown in FIG. 9, the instructing terminal 50 includes a transmitting/receiving unit 51, a storage unit 52, and a determination processing unit 53.

The transmitting/receiving unit 51 is an interface for transmitting/receiving information to/from the first monitoring device 20, the second monitoring device 30, the imaging device 40, and the server 60. The storage unit 52 is a storage medium that stores predetermined information and information transmitted from the imaging device 40 and the server 60, and is configured by a flash memory, a hard disk, or the like.

The determination processing unit 53 is a calculation processing means that generates a dashcam video cut instruction signal ci based on the first monitoring information d1 transmitted from the first monitoring device 20 and the second monitoring information d2 transmitted from the second monitoring device 30.

In the present embodiment, description will be made assuming that the instructing terminal 50 is configured by a smartphone, a tablet PC, or a notebook PC, and the determination processing unit 53 is dedicated software (application program) installed in the instructing terminal 50. However, the instructing terminal 50 may be a dedicated device having the above functions.

As described above, when the determination unit 22 determines that the travel state of the target vehicle 10 satisfies the first monitoring condition, the first monitoring device 20 includes the first monitoring information d1 indicating the travel state of the target vehicle 10 to the instructing terminal 50. Similarly, when the determination unit 32 determines that the physical state during driving of the driver 2 satisfies the second monitoring condition, the second monitoring device 30 transmits the second monitoring information d2 indicating the physical state during driving of the driver 2 to the instructing terminal 50.

The storage unit 52 of the instructing terminal 50 stores a caution determination condition for determining whether or not the driving state of the driver 2 reaches at the level of concern in advance. Examples of the caution determination condition include information on the attention target occurrence time interval (e.g., 10 minutes) and the cumulative point threshold value (e.g., 2 points).

When receiving the first monitoring information d1 and/or the second monitoring information d2 in the transmitting/receiving unit 51, the instructing terminal 50 causes the determination processing unit 53 to perform a process of adding the point value included in each monitoring information (d1, d2) to calculate the cumulative point value and store the cumulative point value in the storage unit 52. Then, when the cumulative point value reaches the cumulative point threshold value stored in the storage unit 52 within the past attention target occurrence time interval (e.g., 10 minutes) including the current time, the determination processing unit 53 determines that the caution determination condition is satisfied, generates the dashcam video cut instruction signal ci, and transmits the dashcam video cut instruction signal from the transmitting/receiving unit 51 to the imaging device 40.

For example, in a case where the cumulative point value is 0 point, when the first monitoring information d1 corresponding to 2 points is received at a certain time T1, and the second monitoring information d2 corresponding to 5 points is received 2 minutes later at time T2, the cumulative point value at this time point is 7 points. Then, when the monitoring information (d1, d2) is not received between time T2 and time T3, which is 10 minutes after time T1, the cumulative point value is updated to 5 points at time T3. Furthermore, when the monitoring information (d1, d2) is not received between time T3 and time T4, which is 10 minutes after time T2, the cumulative point value is updated to 0 point at time T4.

As described above, when receiving the dashcam video cut instruction signal ci from the instructing terminal 50, the imaging device 40 extracts from the continuous dashcam footage information dML stored in the storage unit 43, information of a predetermined time width including the time when the dashcam video cut instruction signal ci is received, generates the dashcam footage information dms, and transmits the dashcam footage information to the instructing terminal 50.

When receiving the dashcam footage information dms from the imaging device 40 in the transmitting/receiving unit 51, the instructing terminal 50 transmits the dashcam footage information dms to the server 60 together with the identification information di for identifying the driver 2. For example, in the storage unit 52 of the instructing terminal 50, information for identifying the target vehicle 10 in which the instructing terminal 50 is mounted (vehicle number etc.) may be stored, and information of the driver 2 (employee ID etc.) may be stored. Particularly, when the instructing terminal 50 is a smartphone assigned to each driver 2, the employee ID of the driver 2 and the like can be stored in the storage unit 52.

<Server 60>

As shown in FIG. 1, in the present embodiment, the server 60 includes a transmitting/receiving unit 61, a storage unit 62, and a notification information creating unit 63. The transmitting/receiving unit 61 is processing means that converts the data received through the telecommunication line into a form in which the data can be calculated, and converts the data to a predetermined form in which transmission and reception are possible and transmits the data through the telecommunication line. The storage unit 62 is formed of a storage medium such as a flash memory or a hard disk. The notification information creating unit 63 is a calculation processing unit that performs a predetermined signal processing (calculation) based on the acquired information, and is configured by dedicated software and/or hardware.

As described above with reference to FIG. 9, when the dashcam footage information dms is transmitted from the instructing terminal 50 in a state associated with the identification information di, the server 60 receives such information in the transmitting/receiving unit 61 and stores the same in the storage unit 62. The storage unit 62 stores the dashcam footage information dms transmitted from the instructing terminal 50 for each identification information di. As shown in FIG. 8, the dashcam footage information dms includes information on the time when the image was imaged (hereinafter referred to as "date and time information dT"). In the example of FIG. 8, the date and time information dT represents the contents from time "T−5 seconds" to time "T+3 seconds".

Figures 10, 11:
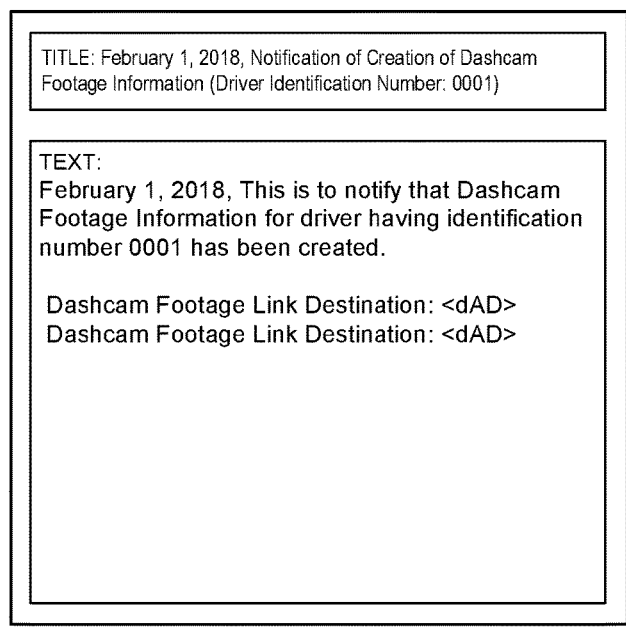
FIG. 10 is a view schematically showing a data sequence format of the dashcam footage information stored in a storage unit of a server.
FIG. 11 is a view schematically showing an example of a content displayed on a display unit of a manager terminal.

For example, when the dashcam footage information dms for 8 seconds from 13:10:20 on Feb. 1, 2018 to 13:10:28 on the same day, and the dashcam footage information dms for 8 seconds from 17:12:18 on Feb. 1, 2018 to 17:12:26 on the same day are created regarding the driver 2 with the code "0001" as the identification information di, the storage unit 62 stores the data as illustrated in FIG. 10. FIG. 10 illustrates a case where the identification information di, the data relating to the imaging start time and the dashcam video time serving as the date and time information dT, and the dashcam footage information dms related to the relevant time are stored in the storage unit 62 in the associated state.

The notification information creating unit 63 creates data describing the address information dAD of the dashcam footage information dms stored in the storage unit 62 for each identification information di at a predetermined timing, and transmits the data from the transmitting/receiving unit 61 to the manager terminal 80.

For example, the notification information creating unit 63 searches for whether or not the dashcam footage information dms received on the same date associated with the identification information di is stored in the storage unit 62 at the timing when the driver 2 corresponding to the identification information di completes the operation service of the day, and when the dashcam footage information is stored, creates the data describing the address information dAD of the storage destination in the storage unit 62. At this time point, if the dashcam footage information dms received on the same date is in plurals as shown in FIG. 10, for example, data describing all of the address information dAD may be created.

<Manager Terminal 80>

The manager terminal 80 is not limited to that mode as long as the manager terminal is a device configured to communicate with the server 60, and for example, is configured by a general-purpose device such as a smartphone, a tablet PC, a notebook PC, a desktop PC, or the like, or a dedicated terminal related to the management assistance system 1. The manager terminal 80 may be stored at a position spaced apart from the installing location of the server 60, or may be held (carried) by the manager.

As shown in FIG. 1, the manager terminal 80 includes a transmitting/receiving unit 81 that transmits/receives information to/from the server 60, a display processing unit 82 that creates information for display based on the received information, and a display unit 83 that displays the information created by the display processing unit 82. The transmitting/receiving unit 81 is a processing means that converts the data received through the telecommunication line into a form in which the data can be calculated, and converts the data to a predetermined form in which transmission and reception are possible and transmits the data through the telecommunication line. The display processing unit 82 is a calculation processing unit that performs prescribed signal processing (calculation) based on the acquired information, and is configured by dedicated software and/or hardware. The display unit 83 corresponds to the monitor screen. For example, as in the case where the manager terminal 80 is configured by a smartphone, the display unit 83 and the manager terminal 80 may be configured integrally, or as in the case where the manager terminal 80 is configured by a desktop PC, the display unit 83 and the manager terminal 80 may be separately configured.

As described above, the server 60 creates data in which the address information dAD of the dashcam footage information dms stored in the storage unit 62 is described for each identification information di at a predetermined timing, and transmits the data to the manager terminal 80. This information may be transmitted from the server 60 to the manager terminal 80 in, for example, an email format. In this case, the storage unit 62 of the server 60 may store the contact email address of the manager terminal 80 in advance. Furthermore, in a carrier that employs a large number of drivers 2, if a manager (operation manager) who has the manager terminal 80 exists in plurals, the contact email address of the manager terminal 80 may be stored in the storage unit 62 of the server 60 in a state of being associated with the identification information di of the driver 2.

In the manager terminal 80, when the transmitting/receiving unit 81 receives the information in which the address information dAD of the dashcam footage information dms is described, the display processing unit 82 performs a predetermined display process and displays the content on the display unit 83. FIG. 11 is an example of a content displayed on the display unit 83. In the example shown in FIG. 11, information specifying the driver 2 in question (here, identification information di), the date in question, and the address information dAD of each dashcam footage information dms are displayed on the display unit 83.

When the manager confirms the display content of the display unit 83 of the manager terminal 80, the manager clicks or touches the address information dAD to access the storage region of the storage unit 62 of the server 60 in which the corresponding dashcam footage information dms is stored. After performing an authentication procedure with the manager terminal 80 as necessary, the server 60 transmits the corresponding dashcam footage information dms to the manager terminal 80. The manager then can check the dashcam footage information dms displayed on the display unit 83 of the manager terminal 80.

Furthermore, the manager can transfer the data (email) in which the address information dAD of the dashcam footage information dms is described to a portable terminal (not shown) personally carried by the driver 2 or the instructing terminal 50. The driver 2 can confirm the transferred email on the terminal and access the link destination to perform the authentication procedure with the server 60 as necessary, and then visually recognize the corresponding dashcam footage information dms on the terminal.

In some cases, the access authority to the server 60 may be limited to a specific terminal such as the manager terminal 80. In such a case, the manager may transmit the data of the dashcam footage information dms itself to a portable terminal (not shown) personally carried by the driver 2 or the instructing terminal 50. In the example of the present embodiment, one piece of dashcam footage information dms is dashcam video information for 8 seconds, and its capacity is extremely small Even if the dashcam footage information dms is about 10 seconds and five corresponding dashcam footage information dms are created for the same driver 2, the dashcam video information is at most about 50 seconds in total. Therefore, with such dashcam footage information dms, the data itself can be attached and transmitted from the manager terminal 80 to the portable terminal personally carried by the driver 2 or the instructing terminal 50.

<Flowchart>

Figure 12:
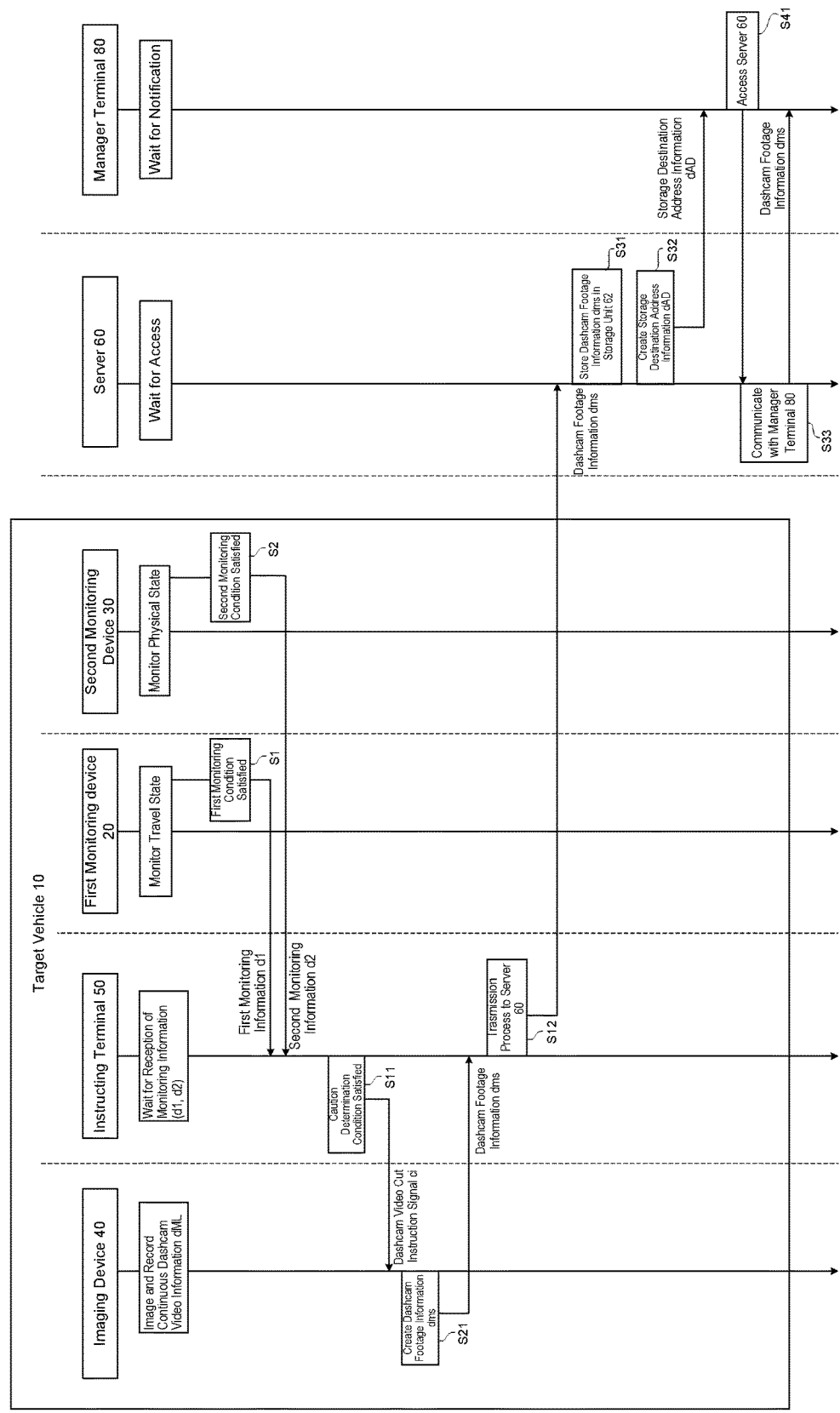
FIG. 12 is a flowchart schematically showing a processing flow of the management assistance system according to the first embodiment.

FIG. 12 is a flowchart schematically showing the processing flow of the management assistance system 1 of the present embodiment. Since the contents are redundant, the description will be simplified.

While the target vehicle 10 is traveling, the first monitoring device 20 monitors the travel state of the target vehicle 10, and the second monitoring device 30 monitors the physical state during driving of the driver 2. These monitoring may be constantly performed when the target vehicle 10 is traveling.

Furthermore, while the target vehicle 10 is traveling, the imaging device 40 images and records the continuous dashcam video information dML.

When determining that the travel state of the target vehicle 10 satisfies the first monitoring condition described above (step S1), the first monitoring device 20 transmits the first monitoring information d1 indicating the travel state of the target vehicle 10 at this time point to the instructing terminal 50. Similarly, when determining that the physical state during driving of the driver 2 satisfies the second monitoring condition (step S2), the second monitoring device 30 transmits the second monitoring information d2 indicating the physical state during driving of the driver 2 at this time point to the instructing terminal 50.

When receiving each monitoring information (d1, d2), the instructing terminal 50 causes the determination processing unit 53 to determine whether or not the caution determination condition stored in the storage unit 52 at the current time point is satisfied (step S11). Then, when confirmed that the caution determination condition is satisfied, the instructing terminal 50 transmits the dashcam video cut instruction signal ci to the imaging device 40.

When receiving the dashcam video cut instruction signal ci, the imaging device 40 extracts information of a predetermined time width including the time when the dashcam video cut instruction signal ci is received from the continuous dashcam video information dML stored in the storage unit 43 to generate the dashcam footage information dms (step S21). Then, the imaging device 40 transmits the dashcam footage information dms to the instructing terminal 50.

When receiving the dashcam footage information dms transmitted from the imaging device 40, the instructing terminal 50 transmits the dashcam footage information dms to the server 60 together with the identification information di for identifying the driver 2 (step S12). The server 60 stores the dashcam footage information dms in the storage unit 62 in a state associated with the identification information di (step S31).

The server 60 creates data in which the address information dAD of the dashcam footage information dms stored in the storage unit 62 is described for each identification information di at a predetermined timing (step S32). Then, the server 60 transmits this address information dAD to the manager terminal 80.

The manager operates the manager terminal 80 to try to access the storage region corresponding to the address information dAD in the storage unit 62 of the server 60 (step S41). When the communication state is properly established between the server 60 and the manager terminal 80 (step S33), the dashcam footage information dms stored in the storage region corresponding to the address information dAD in the storage unit 62 of the server 60 is transmitted to the manager terminal 80.

According to the configuration described above, the first monitoring device 20 and the second monitoring device 30 store, in advance, the dashcam video information in the server 60 when determined that the driving state of the driver 2 reaches the level of concern, that is, corresponding to near-miss event. Furthermore, this dashcam video information is stored in the server 60 as dashcam footage information dms relating to a predetermined time before and after including the time point when determination is made as level of concern in advance. That is, in the server 60, only the event determined to be the driving state corresponding to the near-miss event in the management assistance system 1 according to the present embodiment is automatically stored as a dashcam footage. Therefore, the manager can easily confirm the relevant dashcam video through the display unit 83 of the manager terminal 80, for example, during the daily work period.

Since the dashcam footage information dms is a dashcam video in which only a portion including an event determined to be a driving state corresponding to a near-miss event is extracted, its capacity is extremely small. Thus, for example, the manager can send the dashcam footage information dms itself from the manager terminal 80 to the portable terminal carried by the driver 2 or the instructing terminal 50 to have the driver 2 check the corresponding dashcam video while hindrance with respect to daily work is suppressed on a relatively close day such as after the end of the daily work or the next day. Thus, the driving consciousness can be enhanced with respect to the driver 2.

Note that, as described above, the manager may transmit the data in which the address information dAD of the dashcam footage information dms is described from the manager terminal 80 to the portable terminal personally carried by the driver 2 or the instructing terminal 50, and the driver 2 may operate the terminal to access the server 60 to visually recognize the corresponding dashcam footage information dms.

Another Configuration Example

Hereinafter, another configuration example of the present embodiment will be described.

(1) In the present embodiment, description has been made that the dashcam footage information dms created in the imaging device 40 is transmitted to the instructing terminal 50 and then transmitted to the server 60 in a state associated with the identification information di from the instructing terminal 50. However, when the imaging device 40 is configured to communicate with the server 60, the dashcam footage information dms may be directly transmitted from the imaging device 40 to the server 60 in a state associated with the identification information di. In this case, the dashcam footage information dms may not necessarily be transmitted from the instructing terminal 50 to the server 60. Furthermore, in the above description, the example in which the data in which the address information dAD of the dashcam footage information dms is described is transmitted from the server 60 to the manager terminal 80 has been described, but the dashcam footage information dms itself may be directly transmitted from the server 60 to the manager terminal 80.

Figure 13A:
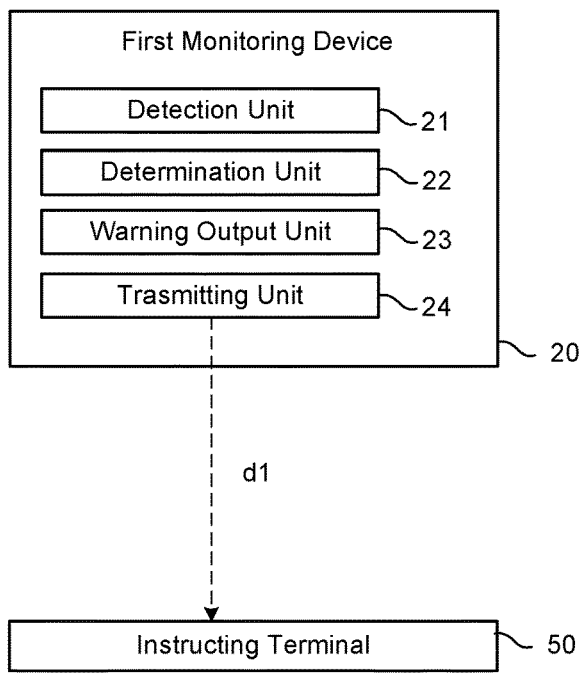
FIG. 13A is another block diagram schematically showing an internal configuration of a first monitoring device.
Figure 13B:
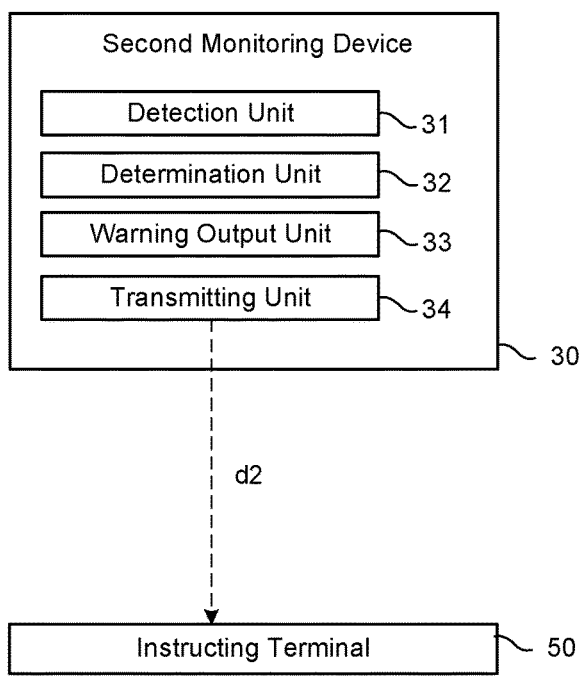
FIG. 13B is another block diagram schematically showing an internal configuration of a second monitoring device.

(2) As shown in FIGS. 13A and 13B, each monitoring device (20, 30) may include a warning output unit (23, 33) for outputting a warning signal in the target vehicle 10.

When the determination unit 22 determines that the travel state of the target vehicle 10 satisfies the first monitoring condition described above, the first monitoring device 20 outputs a warning signal (first warning signal) from the warning output unit 23 into the target vehicle 10. Similarly, when the determination unit 32 determines that the physical state during driving of the driver 2 satisfies the second monitoring condition described above, the second monitoring device 30 outputs a warning signal (second warning signal) from the warning output unit 33 into the target vehicle 10.

The warning output unit 23 and the warning output unit 33 are means for generating and outputting a corresponding audio signal, character or image signal, and are configured by dedicated software and/or hardware.

The first warning signal and the second warning signal merely need to be in a form recognizable by the driver 2, and for example, may be an audio signal output from a speaker mounted on each monitoring device (20, 30) or the target vehicle 10, or may be a character or image signal output on a screen mounted on each monitoring device (20, 30) or the target vehicle 10. As another example, a vibration signal from a vibrator output to a seat on which the driver 2 sits may be used. Furthermore, when each monitoring device (20, 30) and the portable terminal (smartphone) carried by the driver 2 are configured to be communicable, an audio signal, a character/image signal may be output to the smartphone of the driver 2.

At that time, the first warning signal and the second warning signal may include information indicating the content of the warning. For example, when it is determined as the travel state corresponding to the determination value 1-1 by the first monitoring device 20, an audio signal indicating that the target vehicle 10 has deviated the lane with respect to the left side may be output from the speaker, or character information or image information indicating that the target vehicle 10 has deviated the lane with respect to the left side may be displayed on the screen. For example, when determined as the travel state corresponding to the determination value 3-7 by the second monitoring device 30, an audio signal indicating that the driver 2 is feeling sleepy may be output from the speaker, or character information or image information indicating that the driver 2 is feeling sleepy may be displayed on the screen.

The driver 2 recognizes that he/she has been driving such that the travel state satisfies the first warning condition by recognizing the audio and character/image information corresponding to the first warning signal in the target vehicle 10. Thus, the driver 2 is urged to pay attention to the subsequent driving. The driver 2 recognizes audio and character/image information corresponding to the second warning signal in the target vehicle 10 to recognize that he/she is feeling sleepy or tired, and his/her conscious is awakened. Thus, for example, the driver 2 is urged to voluntarily take a break.

(3) The caution determination condition may be stored in advance in the storage unit 62 of the server 60, and the instructing terminal 50 may read out the caution determination condition from the storage unit 62 of the server 60 and store the same in the storage unit 52 of the instructing terminal 50 at for example, the timing when the driver 2 starts driving or operates the instructing terminal 50 before driving. At this time, the caution determination condition may be stored in the storage unit 62 of the server 60 for each identification information di of the driver 2. In this case, the caution determination condition corresponding to the identification information di of the driver 2 is read from the storage unit 62 of the server 60 and stored in the storage unit 52 of the instructing terminal 50.

Second Embodiment

Figure 14:
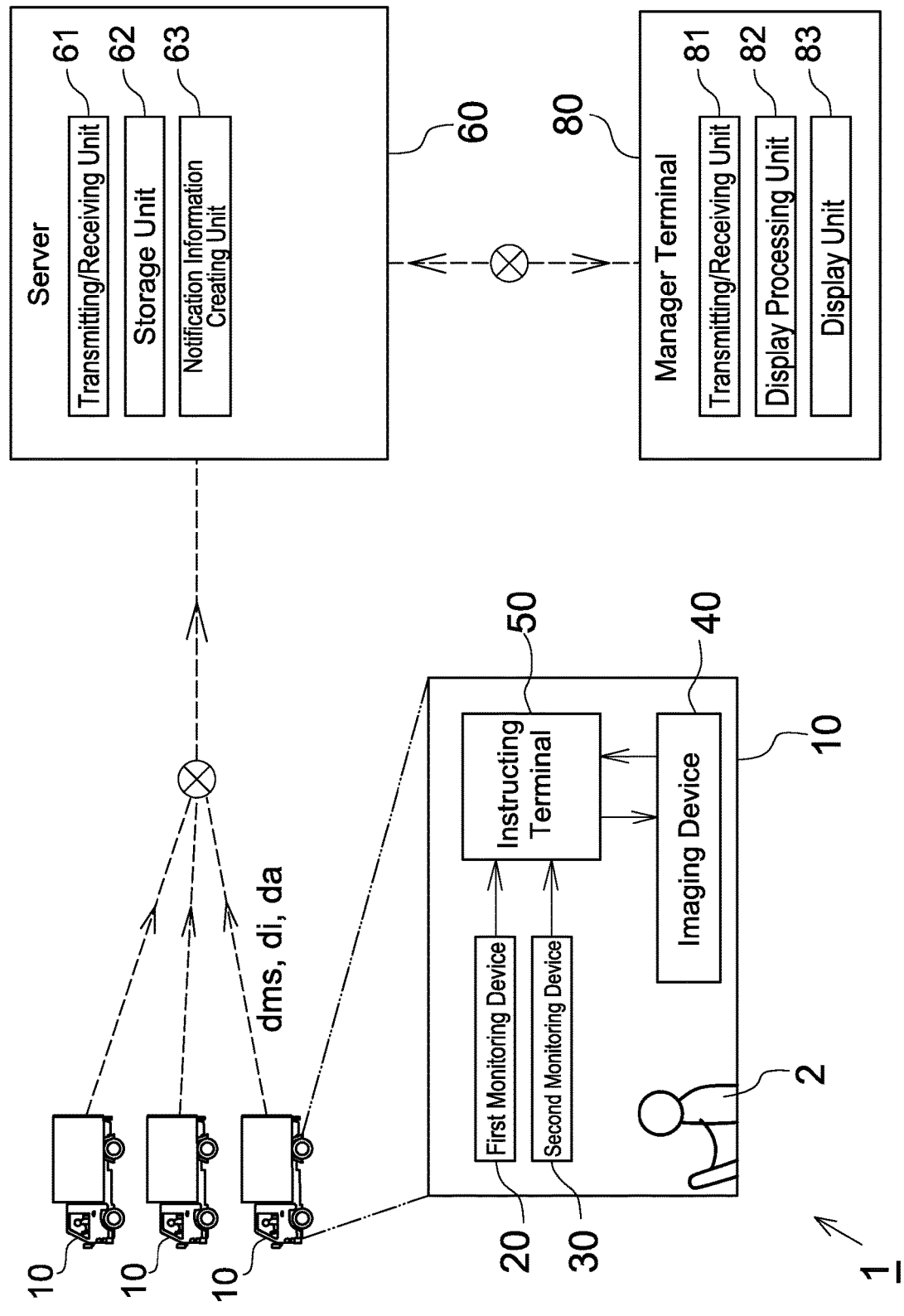
FIG. 14 is a block diagram schematically showing an overall configuration of a second embodiment of a management assistance system.

A second embodiment of the management assistance system according to the present invention will be described focusing on the points different from the first embodiment. FIG. 14 is a block diagram schematically showing an overall configuration of the management assistance system 1 of the present embodiment, and is configured to include the target vehicle 10, the server 60, and the manager terminal 80, as in FIG. 1. In the present embodiment, unlike the first embodiment, monitoring-required notification information da is transmitted from the target vehicle 10, more specifically, the instructing terminal 50 to the server 60.

Figure 15:
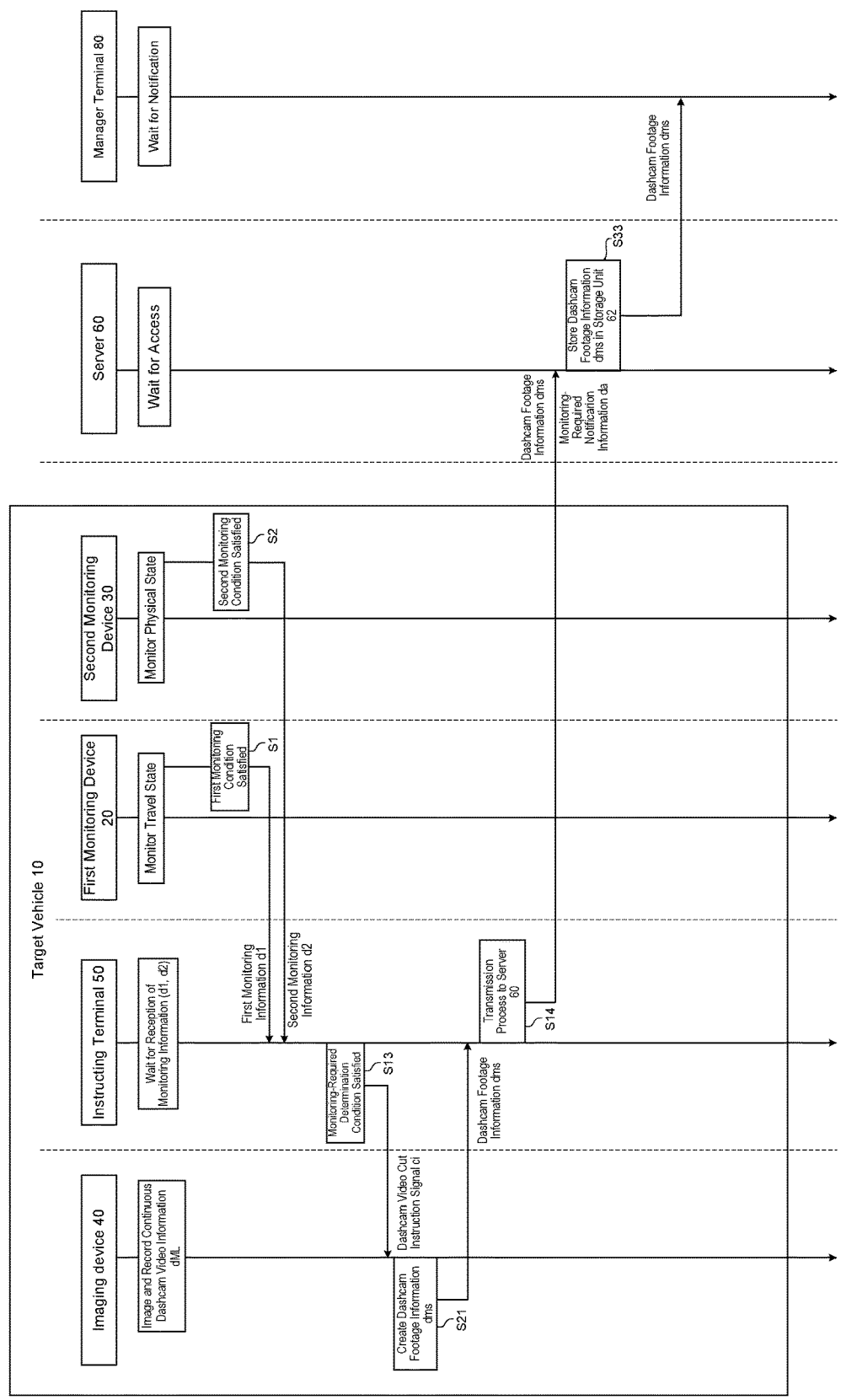
FIG. 15 is a flowchart schematically showing a processing flow of the management assistance system according to the second embodiment.

FIG. 15 is a flowchart schematically showing the process performed by the management assistance system 1 of the present embodiment. It should be noted that in FIG. 15, due to space limitations, some of the processing contents shown in FIG. 12 (steps S11, S12, S31, S32, S33, S41) are not shown, but in the present embodiment, the processes shown in FIG. 15 (steps S13, S14, S33) are performed in addition to each of the above processes.

The instructing terminal 50 stores, in the storage unit 52, monitoring-required determination condition for determining whether or not the driving state of the driver 2 reaches a monitoring-required level, which is more serious than the level of concern, in addition to the caution determination condition for determining whether or not the driving state of the driver 2 reaches the level of concern.

As described above, examples of the caution determination condition include information on the attention target occurrence time interval (e.g., 10 minutes) and the cumulative point threshold value (e.g., 2 points). On the other hand, examples of the monitoring-required determination conditions include information on a monitoring target occurrence time interval (e.g., 10 minutes) and a cumulative point threshold value (e.g., 10 points). That is, in this example, the monitoring target occurrence time interval is set to 10 minutes, which is the same as the attention target occurrence time interval, and the cumulative point value related to the monitoring-required determination condition is set to a value higher than the cumulative point threshold value related to the caution determination condition. In the present embodiment, the cumulative point threshold value set as the caution determination condition is referred to as a "caution cumulative point threshold value", and the cumulative point threshold value set as the monitoring-required determination condition is referred to as a "monitoring-required cumulative point threshold value".

Here, a case where the monitoring target occurrence time interval is set to the same time as the attention target occurrence time interval will be described by way of an example, but both time intervals may be different as long as at least the monitoring-required determination condition is set to a condition (condition in which determination is made as high risk) that is unlikely to occur than the caution determination condition.

Similar to the description of the first embodiment, when receiving the first monitoring information d1 and/or the second monitoring information d2 in the transmitting/receiving unit 51, the instructing terminal 50 causes the determination processing unit 53 to perform a process of adding the point value included in each monitoring information (d1, d2) to calculate the cumulative point value and store the cumulative point value in the storage unit 52.

Similar to the first embodiment, when the cumulative point value reaches the caution cumulative point threshold value stored in the storage unit 52 within the past attention target occurrence time interval (e.g., 10 minutes) including the current time, the determination processing unit 53 determines that the caution determination condition is satisfied, generates the dashcam video cut instruction signal ci, and transmits the same from the transmitting/receiving unit 51 to the imaging device 40.

Furthermore, in the present embodiment, the determination processing unit 53 determines whether or not the cumulative point value reached the monitoring-required cumulative point threshold value stored in the storage unit 52 within the past monitoring target occurrence time interval (e.g., 10 minutes) including the current time (step S13). Since the monitoring-required determination condition is set to be stricter than the caution determination condition, if the monitoring-required determination condition is satisfied, this inevitably means that the caution determination condition is satisfied. Therefore, similar to the description made with reference to FIG. 12, the instructing terminal 50 transmits the dashcam video cut instruction signal ci to the imaging device 40.

Similar to the first embodiment, when receiving the dashcam video cut instruction signal ci, the imaging device 40 extracts information of a predetermined time width including the time when the dashcam video cut instruction signal ci is received from the continuous dashcam video information dML stored in the storage unit 43 to generate the dashcam footage information dms (step S21). This dashcam footage information dms is transmitted to the instructing terminal 50.

When receiving the dashcam footage information dms transmitted from the imaging device 40, since it is recognized that the monitoring-required determination condition is satisfied in step S13 immediately before, the instructing terminal 50 transmits the dashcam footage information dms to the server 60 together with the identification information di for identifying the driver 2 and the monitoring-required notification information da (step S14).

The server 60 stores the dashcam footage information dms in the storage unit 62 in a state associated with the identification information di (step S33). Furthermore, when the server 60 confirms that the monitoring-required notification information da is associated with this dashcam footage information dms, the notification information creating unit 63 immediately creates transmission data with the dashcam footage information dms attached, and transmits the same from the transmitting/receiving unit 61 to the manager terminal 80.

Figure 16:
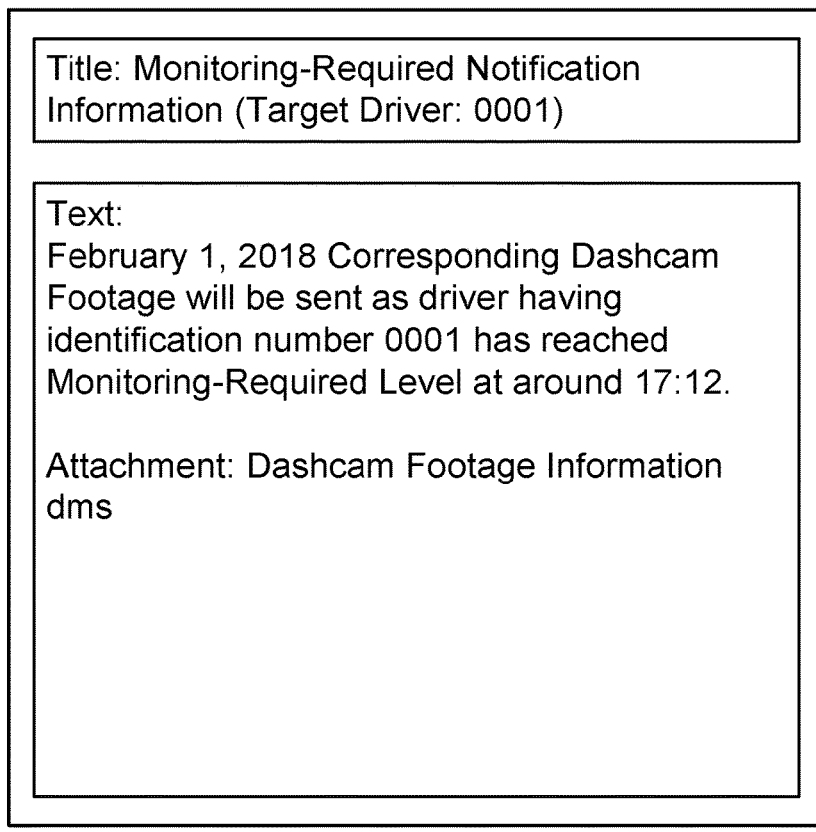
FIG. 16 is a view schematically showing an example of a content displayed on the display unit of the manager terminal.

In the manager terminal 80, when the transmitting/receiving unit 81 receives this information, the display processing unit 82 performs a predetermined display process to display the content on the display unit 83. FIG. 16 is an example of contents displayed on the display unit 83. In the example of FIG. 16, information specifying the corresponding driver 2 (here, identification information di), information indicating that the monitoring-required level is reached, corresponding time, and attached data of the target dashcam footage information dms are displayed on the display unit 83.

When the manager confirms the display content of the display unit 83 of the manager terminal 80, the manager can immediately visually recognize the driving situation of the driver 2 at the corresponding time by opening the attached dashcam footage information dms.

According to such a configuration, only when the driving state of the driver reaches the monitoring-required level beyond the level of concern, the notification thereof and the dashcam footage information itself corresponding to the relevant event are notified to the manager terminal 80 in a more or less near real time situation. Upon detecting the notification to the manager terminal 80, the manager can grasp the driving state of the driver in a more or less near real time situation by immediately checking the corresponding dashcam video. After checking the relevant dashcam video information, for example, the manager can confirm the current physical condition or the like of the driver 2 using means such as a portable phone or wireless communication, if necessary.

In the present embodiment, by displaying a predetermined operation button on the display unit 83 of the manager terminal 80 and pressing the operation button, the corresponding portable phone of the driver 2 or the wireless communication device mounted on the target vehicle 10 driven by the driver 2 may be contacted.

This allows the manager to confirm and contact the driver 2 after checking the dashcam video of the corresponding situation when the driving state of the driver 2 is truly in a state that requires monitoring, and thus appropriate instructions can be given according to the individual situation of the driver. Furthermore, as described above, since the dashcam footage information dms is dashcam video information related to a short period of time, its size is sufficiently small, and it can be attached and sent from the server 60 to the manager terminal 80 through methods such as email.

However, in the present embodiment as well, similar to the first embodiment, instead of the dashcam footage information dms itself, the address information dAD in the storage unit 62 in which the corresponding dashcam footage information dms is stored may be transmitted.

Moreover, in the present embodiment, the instructing terminal 50 may transmit the corresponding dashcam footage information dms to the server 60 and directly transmit the dashcam footage information dms to the manager terminal 80 serving as the target of managing the driver 2. In this case, the instructing terminal 50 may have a function of creating notification information as shown in FIG. 16, for example, similar to the notification information creating unit 63 of the server 60.

The monitoring-required determination condition may be stored in advance in the storage unit 52 of the instructing terminal 50 together with the caution determination condition, or each of the conditions stored in the storage unit 62 of the server 60 may be downloaded by the instructing terminal 50 from the server 60 and stored in the storage unit 52 before the start of driving by the driver 2.

Furthermore, in a case where the information on the work plan is stored in advance in the storage unit 62 of the server 60 for each driver 2, the information on the work plan may be transmitted from the server 60 to the manager terminal 80 together with the transmission data to which the dashcam footage information dms is attached. For example, the time of the monitoring-required notification information da notified this time is collated with the information regarding the work plan, and, for example, the display unit 83 of the manager terminal 80 can be caused to display the fact of currently advancing from point A to point B.

Third Embodiment

Figure 17:
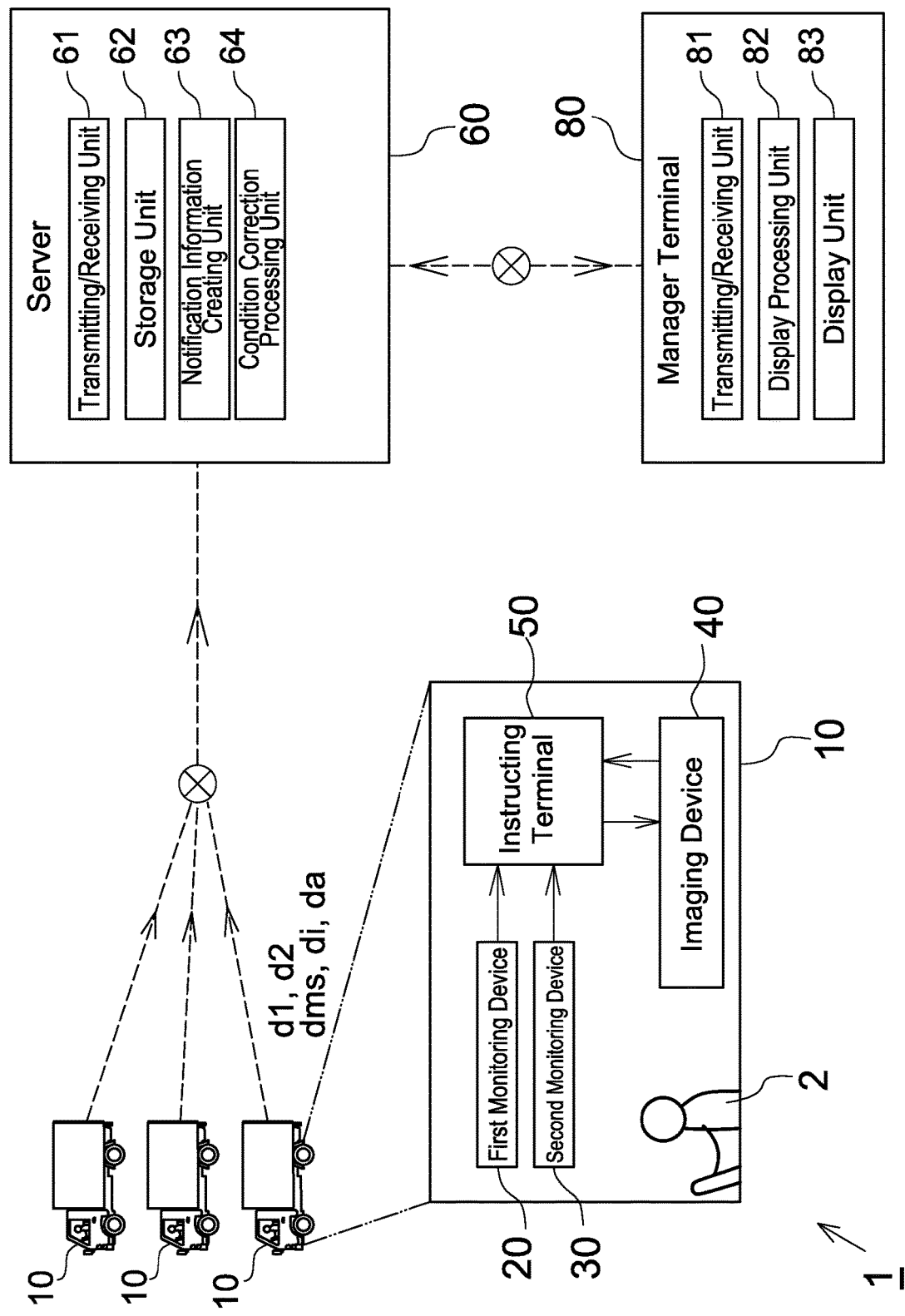
FIG. 17 is a block diagram schematically showing an overall configuration of a third embodiment of a management assistance system.

A third embodiment of the management assistance system according to the present invention will be described focusing on the points different from the second embodiment. FIG. 17 is a block diagram schematically showing an overall configuration of the management assistance system 1 of the present embodiment, and is configured to include the target vehicle 10, the server 60, and the manager terminal 80, as in FIG. 1.

Figure 18:
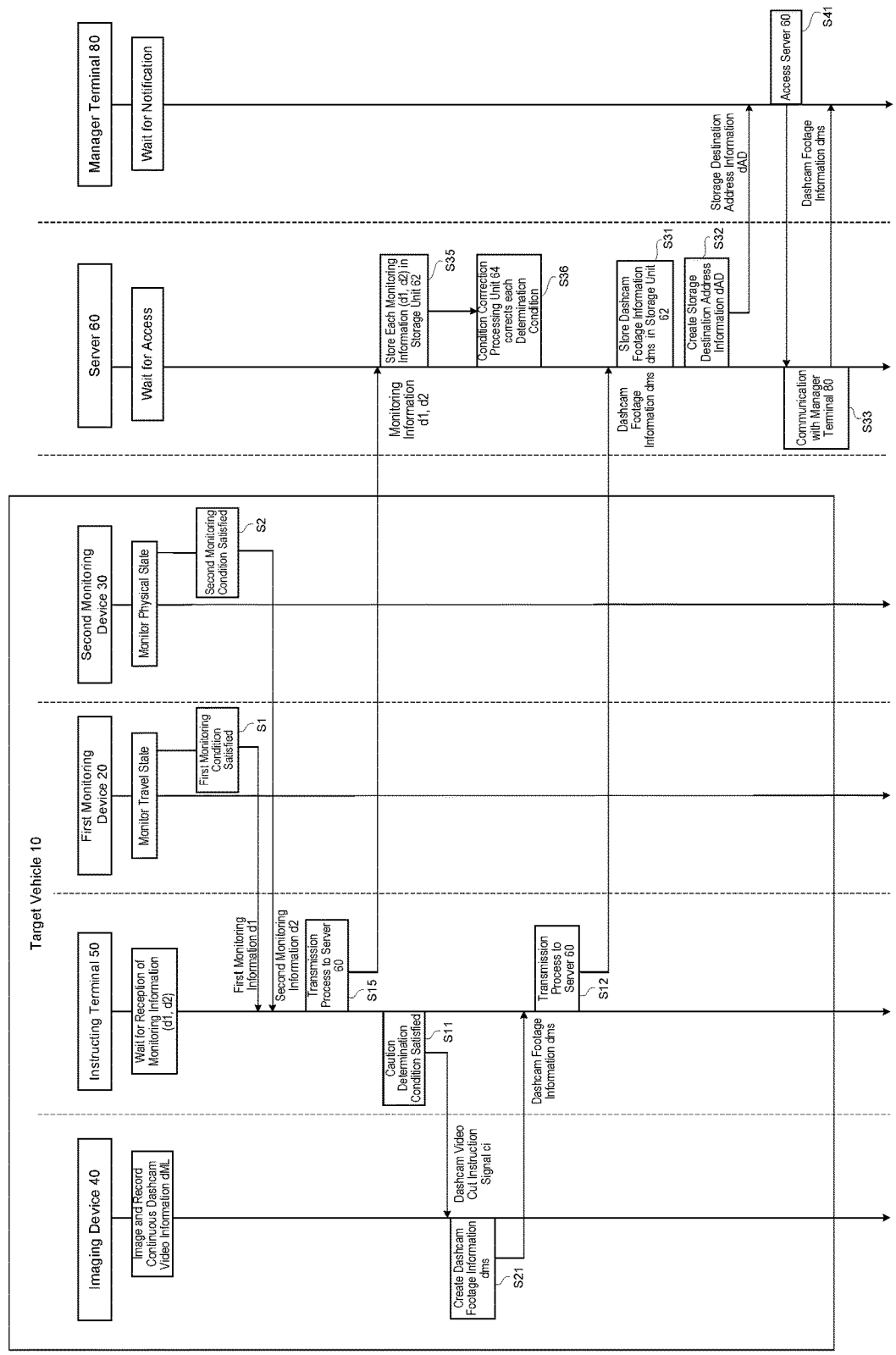
FIG. 18 is a flowchart schematically showing a processing flow of the management assistance system according to the third embodiment.
Figures 19, 20:
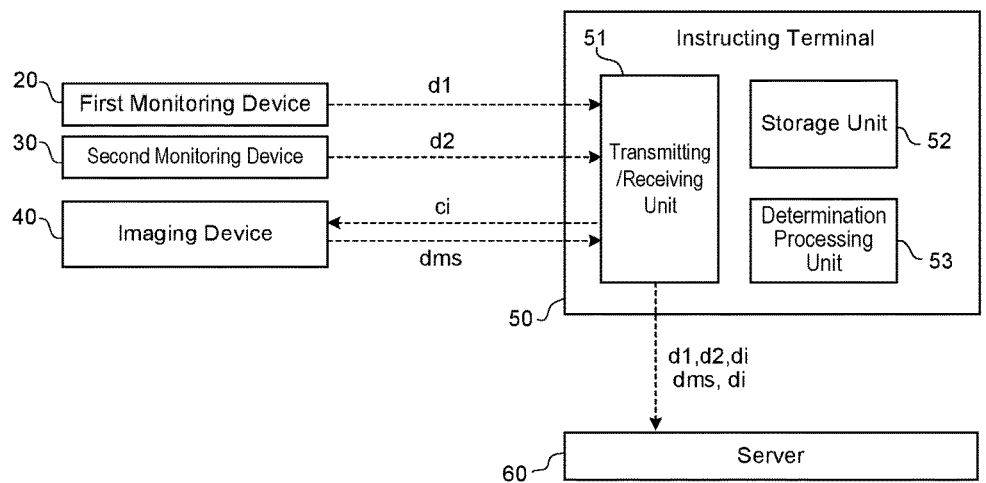
FIG. 19 is a block diagram schematically showing an internal configuration and transmission/reception data of an instructing terminal provided in the management assistance system according to the third embodiment.
FIG. 20 is an example of an index when evaluating the state of the autonomic nerve.

In the present embodiment, unlike the second embodiment, each monitoring information (d1, d2) is transmitted from the target vehicle 10, more specifically, the instructing terminal 50 to the server 60. Furthermore, the server 60 additionally includes a condition correction processing unit 64. FIG. 18 is a flowchart schematically showing the processing flow of the management assistance system 1 of the present embodiment. FIG. 19 is a view schematically showing the configuration of the instructing terminal 50 of the present embodiment, together with the data transmitted and received by the instructing terminal 50.

In FIG. 18, each of the steps (steps S13, S14, S33) described above in the second embodiment with reference to FIG. 15 are not shown, but this is due to space limitations, and these steps S13, S14, and S33 may also be performed.

When receiving each monitoring information (d1, d2) from each monitoring device (20, 30), the instructing terminal 50 transmits each monitoring information (d1, d2) in a state associated with the identification information di of the driver 2 from the transmitting/receiving unit 51 to the server 60 (step S15). Note that, in the instructing terminal 50, the determination processing unit 53 determines whether or not the caution determination condition and the monitoring-required determination condition are satisfied, as in the above embodiments.

The server 60 stores the transmitted monitoring information (d1, d2) in the storage unit 62 in a state of being associated with the identification information di of the driver 2 (step S35). Then, the condition correction processing unit 64, for example, corrects the information regarding the cumulative point threshold value of the appropriate caution determination condition and the monitoring-required determination condition by AI processing based on the past monitoring information (d1, d2) (step S36).

For example, when the storage unit 62 of the server 60 stores weather conditions, road conditions and the like at the past time point when the driver 2 has traveled, information regarding the cumulative point threshold value of the caution determination condition and the monitoring-required determination condition can be corrected in view of such information.

According to the configuration described above, the storage unit 62 stores, for each identification information di of the driver 2, information related to the caution determination condition or the monitoring-required determination condition according to the past tendency of the driver 2. The instructing terminal 50 reads the information related to the caution determination condition or the monitoring-required determination condition of the driver 2 from the storage unit 62 of the server 60 at a predetermined timing and stores the information in the storage unit 52. As described above, in the aspect of the present embodiment, since the caution determination condition or the monitoring-required determination condition are set according to the past tendency of the driver 2, the management of the driving state that corresponds more to the characteristics of the driver 2 becomes possible.

In the example of FIG. 18, the condition correction processing unit 64 of the server 60 has been described as updating the information in the storage unit 62 by sequentially performing the correction process on the information related to the caution determination condition or the monitoring-required determination condition, but the condition correction processing unit 64 may update the information in the storage unit 62 by performing the correction process at a predetermined timing (e.g., once a day). In the latter case, the condition correction processing unit 64 of the server 60 performs a correction process on the information related to the caution determination condition or the monitoring-required determination condition of the driver 2 before the operation of the driver 2, and updates the corresponding information in the storage unit 62.

When the condition correction processing unit 64 of the server 60 performs the correction process on the information related to the caution determination condition or the monitoring-required determination condition of the driver 2 before the operation of the driver 2, information regarding the physical state of the driver 2 before driving may be taken into consideration. For example, the driver 2 performs a process of acquiring information on the physical state (pre-driving physical state) before driving the target vehicle 10. For such information, for example, the body temperature, blood pressure, autonomic nerve, pulse wave, heart rate, blood oxygen concentration, and the like of the driver 2 can be used. Hereinafter, a device for measuring the pre-driving physical state of the driver 2 is referred to as "pre-driving physical state measuring device". The pre-driving physical state measuring device may be permanently installed in a business office where the target vehicle 10 is parked, or may be mounted on each target vehicle 10. Furthermore, the pre-driving physical state measuring device may be a single device or a plurality of device groups.

The pre-driving physical state measuring device measures various biological signals of the driver 2 before driving, and transmits the biological signals to the server 60. The server 60 causes the storage unit 62 to store therein the various biological signals of the driver 2 before driving. That is, the pre-driving physical state measuring device is configured to wirelessly communicate with the server 60. Note that as long as at least the various biological signals measured by the pre-driving physical state measuring device can be transmitted to the server 60, the pre-driving physical state measuring device may not necessarily include a communication means.

Various biological signals of the driver 2 in the past are stored in the storage unit 62 of the server 60. Furthermore, various biological signals of the driver 2 before and after driving in the past or the tendency of the biological signals may be stored. The condition correction processing unit 64 reads various biological signals of the driver 2 from the storage unit 62 and determines the physical state of the driver 2 at the current time point (hereinafter, referred to as "pre-driving physical state"). For example, if the body temperature of the driver 2 transmitted before driving is higher than the past average body temperature of the driver 2 by greater than or equal to 2° C., determination is made that the pre-driving physical state of the driver 2 is a caution state. Furthermore, as another example, the state of the autonomic nerves of the driver 2 transmitted before driving is evaluated based on the conditions in the table shown in FIG. 20, and whether or not the pre-driving physical state of the driver 2 is a caution state is determined. As still another example, the tendency of the biological signal after driving is predicted from the biological signal before driving, and whether or not the pre-driving physical state is an attention state is determined.

In FIG. 20, "LF" corresponds to an index reflecting the sympathetic nerve, and "HF" corresponds to an index reflecting the parasympathetic nerve. A deviation value Ti is a value obtained by converting a value (ccvTP) in which a value (TP) indicating the function of the entire autonomic nerve function is corrected with the heart rate into a deviation value according to the age of the driver 2. Each of the values of LF, HF, and the deviation value Ti shown in FIG. 20 can be calculated through a calculation process by the condition correction processing unit 64 based on the values of biological signals such as the pulse wave and heartbeat of the driver 2 measured by the pre-driving physical state measuring device. It should be noted that the storage unit 62 of the server 60 may store information regarding the age of each driver 2.

For example, when determining that the pre-driving physical state of the driver 2 is "caution", the condition correction processing unit 64 corrects the caution determination condition or the monitoring-required determination condition of the driver 2 stored in the storage unit 62. More specifically, for example, the correction is performed to reduce the caution cumulative point threshold value and the monitoring-required cumulative point threshold value. As a result, the frequency with which the dashcam footage information dms is created increases, and the frequency with which the monitoring-required notification information da is notified to the manager terminal 80 (i.e., the frequency with which the monitoring-required determination condition is satisfied) increases. In particular, since the conditions (monitoring-required determination condition) under which the monitoring-required notification information da is transmitted to the manager terminal 80 are stricter, the manager can manage in a more concentrating manner the driver 2 whose pre-driving physical state is determined to be caution.

Each value of $n=n_1$, $n_2$, and $n_3$ in FIG. 20 may be appropriately set according to the pre-driving physical state of the driver 2, or may be a prescribed specified value.

Another Embodiment

Hereinafter, another embodiment will be described.

<1> The caution determination condition and the monitoring-required determination condition described above are merely examples, and the present invention is not limited to these contents.

<2> When the target vehicle 10 is present within a region where imaging by the imaging device 40 is prohibited, the imaging by the imaging device 40 is automatically stopped or a mask is automatically applied on the imaging device 40. Specifically, when a car navigation system (not shown) is installed in the target vehicle 10, the imaging prohibited region may be registered in advance in this car navigation system. When the car navigation system detects that the target vehicle 10 is present in the imaging prohibited region, the car navigation system notifies the imaging device 40 of a signal to that effect, so that the imaging from the imaging device 40 is automatically stopped or disabled.

<3> The present invention is not limited to the embodiments described above, and includes various modified examples. For example, the embodiments described above have been described in detail for better understanding of the present invention, and are not necessarily limited to those including all configurations of the description. The scope of the present invention is defined by the Claims, and it is intended to include meanings equivalent to the Claims and all modifications within the scope.

DESCRIPTION OF REFERENCE SIGNS 1 management assistance system
2 driver
10 target vehicle
20 first monitoring device
21 detection unit
22 determination unit
23 warning output unit
24 transmitting unit
30 second monitoring device
31 detection unit
32 determination unit
33 warning output unit
34 transmitting unit
40 imaging device
41 transmitting/receiving unit
42 imaging unit
43 storage unit
44 video processing unit
50 instructing terminal
51 transmitting/receiving unit
52 storage unit
53 determination processing unit
60 server
61 transmitting/receiving unit
62 storage unit
63 notification information creating unit
64 condition correction processing unit
80 manager terminal
81 transmitting/receiving unit
82 display processing unit
83 display unit
ci dashcam video cut instruction signal
d1 first monitoring information
d2 second monitoring information
da monitoring-required notification information
dAD address information
di identification information
dML continuous dashcam video information
dms dashcam footage information
dT date and time information

The invention claimed is:

1. A management assistance system that assists management of a driving state of a driver driving a target vehicle, the management assistance system comprising:
an imaging device that is mounted on the target vehicle to image at least a front of the target vehicle as continuous dashcam video information;
a first monitoring device that is mounted on the target vehicle to monitor a travel state of the target vehicle;
a second monitoring device that is mounted on the target vehicle to monitor a physical state during driving of the driver;
an instructing terminal that is mounted on the target vehicle and configured to receive information from the first monitoring device and the second monitoring device;
a server configured to wirelessly communicate with at least one of the instructing terminal and the imaging device; and
a manager terminal configured to wirelessly communicate with the server;
wherein:
the first monitoring device transmits first monitoring information corresponding to the travel state to the instructing terminal when the travel state satisfies a predetermined first monitoring condition;
the second monitoring device transmits second monitoring information corresponding to the physical state during driving to the instructing terminal when the physical state during driving satisfies a predetermined second monitoring condition;
the instructing terminal is configured to:
store a caution determination condition for determining whether or not the driving state of the driver reaches a level of concern, and a monitoring-required determination condition for determining whether or not the driving state of the driver reaches a monitoring-required level, which is more serious than the level of concern, and
determine whether or not the caution determination condition is satisfied based on the first monitoring information transmitted from the first monitoring device and the second monitoring information transmitted from the second monitoring device, and transmit a dashcam video cut instruction signal to the imaging device when determining that the caution determination condition is satisfied;
the imaging device, when receiving the dashcam video cut instruction signal transmitted from the instructing terminal, extracts information of a predetermined time width including a reception time of the dashcam video cut instruction signal from the continuous dashcam video information to create dashcam footage information imaged the front of the target vehicle, associates the dashcam footage information with date and time information related to the imaged time, and identification information for identifying the target vehicle or the driver serving as a transmitting source, and transmits the information to the server through the instructing terminal or directly;
the server stores the dashcam footage information;
the instructing terminal is configured to, when determining that the driving state of the driver exceeds the level of concern and satisfies the monitoring-required determination condition, transmit monitoring-required notification information indicating that the driving state of the driver reaches the monitoring-required level to the server together with the dashcam footage information; and
the server immediately transmits the dashcam footage information itself or address information in which the dashcam footage information is stored and the monitoring-required notification information to the manager terminal.

2. The management assistance system according to claim 1, further comprising:

a manager terminal configured to wirelessly communicate with the server; wherein, when storing the dashcam footage information, the server transmits information including address information in which the dashcam footage information is stored to the manager terminal within a predetermined time period.

3. The management assistance system according to claim 1, wherein:
the first monitoring information includes information related to a point value converted to a numerical value according to a risk of the travel state;
the second monitoring information includes information related to a point value converted to a numerical value according to a non-awakening degree of the driver;
the caution determination condition includes information related to an attention target occurrence time interval and a cumulative point threshold value defined according to the risk and the non-awakening degree; and
based on the received first monitoring information and the second monitoring information as well as the reception time thereof, when cumulative values of the point values of the first monitoring information and the second monitoring information within the attention target occurrence time interval exceed the cumulative point threshold value, the instructing terminal determines that the caution determination condition is satisfied.

4. The management assistance system according to claim 3, wherein the first monitoring device detects at least one of a separation distance between the target vehicle and a front obstacle located in front of the target vehicle, whether the target vehicle departed from a lane in which the target vehicle is traveling, and an acceleration of the target vehicle, and determines the risk set in advance based on the detection; and
the second monitoring device detects at least one of a heartbeat and a pulse wave of the driver, and determines the non-awakening degree set in advanced based on the detection.

5. The management assistance system according to claim 1, wherein the instructing terminal stores the caution determination condition corresponding to the identification information.

6. The management assistance system according to claim 2, wherein
the first monitoring information includes information related to a point value converted to a numerical value according to a risk of the travel state;
the second monitoring information includes information related to a point value converted to a numerical value according to a non-awakening degree of the driver;
the caution determination condition includes information related to an attention target occurrence time interval and a cumulative point threshold value defined according to the risk and the non-awakening degree; and
based on the received first monitoring information and the second monitoring information as well as the reception time thereof, when cumulative values of the point values of the first monitoring information and the second monitoring information within the attention target occurrence time interval exceed the cumulative point threshold value, the instructing terminal determines that the caution determination condition is satisfied.

7. The management assistance system according to claim 6, wherein the first monitoring device detects at least one of a separation distance between the target vehicle and a front obstacle located in front of the target vehicle, whether the target vehicle departed from a lane in which the target vehicle is traveling, and an acceleration of the target vehicle, and determines the risk set in advance based on the detection result; and
the second monitoring device detects at least one of a heartbeat and a pulse wave of the driver, and determines the non-awakening degree set in advanced based on the detection result.

8. A management assistance system that assists management of a driving state of a driver driving a target vehicle, the management assistance system comprising:
a first monitoring device that is mounted on the target vehicle to monitor a travel state of the target vehicle;
a second monitoring device that is mounted on the target vehicle to monitor a physical state during driving of the driver;
an instructing terminal that is mounted on the target vehicle and configured to receive information from the first monitoring device and the second monitoring device;
a server configured to wirelessly communicate with at least one of the instructing terminal and the imaging device; and
a manager terminal configured to wirelessly communicate with the instructing terminal;
wherein:
the first monitoring device transmits first monitoring information corresponding to the travel state to the instructing terminal when the travel state satisfies a predetermined first monitoring condition;
the second monitoring device transmits second monitoring information corresponding to the physical state during driving to the instructing terminal when the physical state during driving satisfies a predetermined second monitoring condition;
the instructing terminal is configured to:
store a caution determination condition for determining whether or not the driving state of the driver reaches a level of concern, and a monitoring-required determination condition for determining whether or not the driving state of the driver reaches a monitoring-required level, which is more serious than the level of concern, and
determine whether or not the caution determination condition is satisfied based on the first monitoring information transmitted from the first monitoring device and the second monitoring information transmitted from the second monitoring device, and transmit a dashcam video cut instruction signal to the imaging device when determining that the caution determination condition is satisfied;
the imaging device, when receiving the dashcam video cut instruction signal transmitted from the instructing terminal, extracts information of a predetermined time width including a reception time of the dashcam video cut instruction signal from the continuous dashcam video information to create dashcam footage information imaged the front of the target vehicle, associates the dashcam footage information with date and time information related to the imaged time, and identification information for identifying the target vehicle or the driver serving as a transmitting source, and transmits the information to the server through the instructing terminal or directly;
the server stores the dashcam footage information;

the instructing terminal is configured to, when determining that the driving state of the driver exceeds the level of concern and satisfies the monitoring-required determination condition, transmit monitoring-required notification information indicating that the driving state of the driver reaches the monitoring-required level to the manager terminal together with the dashcam footage information.

9. The management assistance system according to claim 8, further comprising:
a manager terminal configured to wirelessly communicate with the server; wherein
when storing the dashcam footage information, the server transmits information including the stored address to the manager terminal within a predetermined time period.

10. The management assistance system according to claim 9, wherein
the first monitoring information includes information related to a point value converted to a numerical value according to a risk of the travel state;
the second monitoring information includes information related to a point value converted to a numerical value according to a non-awakening degree of the driver;
the caution determination condition includes information related to an attention target occurrence time interval and a cumulative point threshold value defined according to the risk and the non-awakening degree; and
based on the received first monitoring information and the second monitoring information as well as the reception time thereof, when cumulative values of the point values of the first monitoring information and the second monitoring information within the attention target occurrence time interval exceed the cumulative point threshold value, the instructing terminal determines that the caution determination condition is satisfied.

11. The management assistance system according to claim 10, wherein the first monitoring device detects at least one of a separation distance between the target vehicle and a front obstacle located in front of the target vehicle, whether the target vehicle departed from a lane in which the target vehicle is traveling, and an acceleration of the target vehicle, and determines the risk set in advance based on the detection result; and
the second monitoring device detects at least one of a heartbeat and a pulse wave of the driver, and determines the non-awakening degree set in advanced based on the detection result.

12. The management assistance system according to claim 8, wherein
the first monitoring information includes information related to a point value converted to a numerical value according to a risk of the travel state;
the second monitoring information includes information related to a point value converted to a numerical value according to a non-awakening degree of the driver;
the caution determination condition includes information related to an attention target occurrence time interval and a cumulative point threshold value defined according to the risk and the non-awakening degree; and
based on the received first monitoring information and the second monitoring information as well as the reception time thereof, when cumulative values of the point values of the first monitoring information and the second monitoring information within the attention target occurrence time interval exceed the cumulative point threshold value, the instructing terminal determines that the caution determination condition is satisfied.

13. The management assistance system according to claim 12, wherein the first monitoring device detects at least one of a separation distance between the target vehicle and a front obstacle located in front of the target vehicle, whether the target vehicle departed from a lane in which the target vehicle is traveling, and an acceleration of the target vehicle, and determines the risk set in advance based on the detection result; and
the second monitoring device detects at least one of a heartbeat and a pulse wave of the driver, and determines the non-awakening degree set in advanced based on the detection result.

* * * * *

UNITED STATES PATENT AND TRADEMARK OFFICE
CERTIFICATE OF CORRECTION

PATENT NO. : 11,214,263 B2
APPLICATION NO. : 17/050203
DATED : January 4, 2022
INVENTOR(S) : Kiminori Sato et al.

It is certified that error appears in the above-identified patent and that said Letters Patent is hereby corrected as shown below:

On the Title Page

Page 2, Column 2, Line 11, item (56) delete "6132327 61" and insert --6132327 B1--.

In the Drawings

Sheet 12 of 16 (fig 15), Line 24 (approx.), delete "Notificarion" and insert --Notification--.

In the Specification

Column 18, Line 12 (approx.), delete "small" and insert --small.--.

Column 19, Line 57 (approx.), delete "Another Configuration Example" and insert --<Another Configuration Example>--.

In the Claims

Column 30, Line 4-5, Claim 7, delete "detection result;" and insert --detection;--.

Column 30, Line 9 (approx.), Claim 7, delete "detection result." and insert --detection.--.

Column 32, Line 2-3, Claim 11, delete "detection result;" and insert --detection;--.

Column 32, Line 7, Claim 11, delete "detection result." and insert --detection.--.

Column 32, Line 7, Claim 13, delete "detection result;" and insert --detection;--.

Column 32, Line 36-37 (approx.), Claim 13, delete "detection result;" and insert --detection;--.

Column 32, Line 41 (approx.), Claim 13, delete "detection result." and insert --detection.--.

Signed and Sealed this
Seventeenth Day of May, 2022

Katherine Kelly Vidal
*Director of the United States Patent and Trademark Office*